(12) United States Patent
Rouse

(10) Patent No.: US 12,514,265 B2
(45) Date of Patent: *Jan. 6, 2026

(54) SYSTEM AND METHOD FOR PROCESSING INVASIVE PLANTS AND CREATING USEFUL PRODUCTS

(71) Applicant: PLANT SYNERGIES, LLC, Sunriver, OR (US)

(72) Inventor: Michael W. Rouse, Sunriver, OR (US)

(73) Assignee: Plant Synergies, LLC, Sunriver, OR (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/647,347

(22) Filed: Apr. 26, 2024

(65) Prior Publication Data

US 2024/0268418 A1 Aug. 15, 2024

Related U.S. Application Data

(63) Continuation-in-part of application No. 17/348,518, filed on Jun. 15, 2021.

(60) Provisional application No. 63/462,054, filed on Apr. 26, 2023, provisional application No. 63/040,517, filed on Jun. 17, 2020.

(51) Int. Cl.
| | |
|---|---|
| *A23K 10/30* | (2016.01) |
| *A23K 30/10* | (2016.01) |
| *A23K 40/10* | (2016.01) |
| *B01J 19/08* | (2006.01) |
| *B01J 19/12* | (2006.01) |
| *B02C 7/00* | (2006.01) |
| *B02C 23/18* | (2006.01) |

(52) U.S. Cl.
CPC .............. *A23K 10/30* (2016.05); *A23K 30/10* (2016.05); *A23K 40/10* (2016.05); *B01J 19/126* (2013.01); *B02C 7/00* (2013.01); *B02C 23/18* (2013.01); *B01J 19/08* (2013.01)

(58) Field of Classification Search
CPC ............................. B02C 23/18; B01J 19/126
See application file for complete search history.

(56) References Cited

U.S. PATENT DOCUMENTS

| | | | | |
|---|---|---|---|---|
| 2011/0111456 A1* | 5/2011 | Medoff | .................. | B01J 19/081 |
| | | | | 435/68.1 |
| 2014/0011248 A1* | 1/2014 | Medoff | ................ | C07D 307/50 |
| | | | | 549/429 |
| 2018/0066293 A1* | 3/2018 | Charron | .................. | C08L 97/02 |

* cited by examiner

*Primary Examiner* — Bradley R Spies
(74) *Attorney, Agent, or Firm* — McBee Moore & Vanik IP, LLC

(57) ABSTRACT

A livestock food product that includes at least one or more plant-based agricultural feeds containing at least one or more plant residues of at least one or more noxious and/or invasive plants. The one or more residues containing no more than 10% of the naturally occurring amount, by weight, of at least one noxious compound that was present in the one or more noxious and/or invasive plants, the naturally occurring amount being the amount of the at least one noxious compound that was present in the noxious and/or original plants while they were alive. The one or more noxious and/or invasive plants including at least one of hemp, tumbleweed, sagebrush, or cheat grass. These plants fibers contain valuable nutrients and flourish under semiarid conditions in abundance. Proper harvesting techniques, bioprocessing can make these plant valuable resources available to mankind environmentally and economically.

4 Claims, 23 Drawing Sheets

SYSTEM AND METHOD FOR PROCESSING INVASIVE PLANTS AND CREATING USEFUL PRODUCTS

CROSS-REFERENCE TO RELATED APPLICATIONS

The present application claims priority to U.S. Provisional Patent Application No. 63/462,054, filed Apr. 26, 2023 and U.S. patent application Ser. No. 17/348,518, filed Jun. 15, 2021, which claims priority to U.S. Provisional Patent Application No. 63/040,517, filed on Jun. 17, 2020, the contents of which are incorporated in their entirety.

BACKGROUND

1. Field

Disclosed embodiments relate to systems and methods for the processing of plants and more particularly to systems and methods for extracting noxious chemicals from noxious plants and creating useful products.

2. Description of Related Art

Many naturally-occurring raw materials have noxious or toxic chemicals that must be extracted before these raw materials can be converted into useful products. Some of these raw materials may be plant stocks of some native and invasive, toxic, or poisonous plants. These plant stocks often contain noxious or toxic chemicals. For example, many native and invasive, toxic, or poisonous plants, such as tumbleweed (*Salsula targus*), naturally contain oxalic and di-oxalic acids which are toxic to animals and humans. Other invasive or noxious plants include kudzu, rosemary bean (*Abrus precatorius*) and sage brush. There is a need for systems and methods to extract the noxious or toxic chemicals from plant stocks derived from the above plants and to convert the plant stocks into useful products.

A similar issue arises in the context of petroleum and/or natural gas extraction from sands and similar materials such as shale, zeolite, and sandstone (collectively referred to as "sand"). There is a also a need for systems and methods to extract the petroleum and/or natural gas from the sand.

Forage is a plant material (mainly plant leaves and stems) eaten by grazing livestock. Over time, the demand for grazing livestock has increased due to the need to feed an ever-growing population, scarcity of irrigation and fertilizers. Consequently new sources of forage are needed to keep up with the demand for grazing livestock.

SUMMARY

The following summary introduces at a high level a limited number of topics described in the Detailed Description. This summary is not intended to identify key or essential features and should not be used for that purpose. In addition, this summary is not intended to be used as a guide to the scope of the claims. Instead, this Summary is provided as an introduction for the reader.

Some embodiments may include a system that is configured to extract useful products from a poisonous and/or a toxic plant stock.

In some embodiments, the system may include at least a wet-grinding apparatus. The wet-grinding apparatus may include at least (1) a fluid conveyance configured for receive and direct a slurry flow that contains at least one or more carrier liquids and at least suspended plant stock, (2) a high torque motor, (3) a motor drive operably coupled to be driven by the high torque motor, (4) a set of flat grinding disks that are operably coupled to be driven by the motor drive and that are configured, when receiving power via the motor drive, to accept the slurry flow, to grind the suspended plant stock, and to discharge the slurry flow, and (5) a fluid outflow configured to receive the discharged ground slurry flow and to evacuate the ground slurry flow to outside the wet-grinding apparatus.

Some embodiments further include at least a microwave unit that includes at least a microwave emitter configured to emit microwave radiation toward the slurry; and wherein the microwave unit is configured to direct microwave radiation toward the slurry at least one of before, while, or after the slurry is ground by the wet-grinding apparatus.

Some additional embodiments provide a method for extracting useful products from at least a poisonous and/or a toxic plant stock. In some embodiments the method may include at least conveying a slurry that contains at least one or more carrier liquids and at least some plant stock suspended in the one or more carrier liquids, the conveying being performed at least in part with a conveyance of a wet-grinding apparatus.

In some embodiments the method further includes at least driving at least one disk of a set of flat grinding disks or be conical in design, of the wet-grinding apparatus, with a motor drive coupled with a high torque motor, the driving causing the set of flat grinding disks to accept the slurry on one or more surfaces, to grind the suspended plant stock, and to discharge the slurry;

In some embodiments the method further includes at least receiving the discharged slurry flow and evacuating it outside the wet-grinding apparatus.

In some embodiments the method further includes at least emitting microwave radiation, with at least one microwave emitter, toward at least a portion of the slurry at least one of before, while, or after the suspended plant stock is ground by the wet-grinding apparatus.

Some embodiments include a method for extracting useful products from petroleum-based reservoir materials. In some embodiments the method includes at least conveying a slurry that contains at least one or more carrier liquids and at least some petroleum-based reservoir materials suspended in the one or more carrier liquids, the conveying being performed at least in part with a conveyance of a wet-grinding apparatus.

In some embodiments the method further includes at least driving at least one disk of a set of flat grinding disks, of the wet-grinding apparatus, with a motor drive coupled with a high torque motor, the driving causing the set of flat grinding disks to accept the slurry on one or more surfaces, to grind the suspended petroleum-based reservoir materials, and to discharge the slurry.

In some embodiments the method further includes at least receiving the discharged slurry flow and evacuating it outside the wet-grinding apparatus. In some embodiments the method further includes at least emitting microwave radiation, with at least one microwave emitter, toward at least a portion of the slurry at least one of before, while, or after the suspended petroleum-based reservoir materials is ground by the wet-grinding apparatus. In some case super cooling of the slurry may be added to the process stream or super heating.

BRIEF DESCRIPTION OF THE DRAWINGS

The above and other aspects, features, and aspects of the disclosed embodiments will be more apparent from the following description taken in conjunction with the accompanying drawings, in which.

DETAILED DESCRIPTION

Figure 1A:
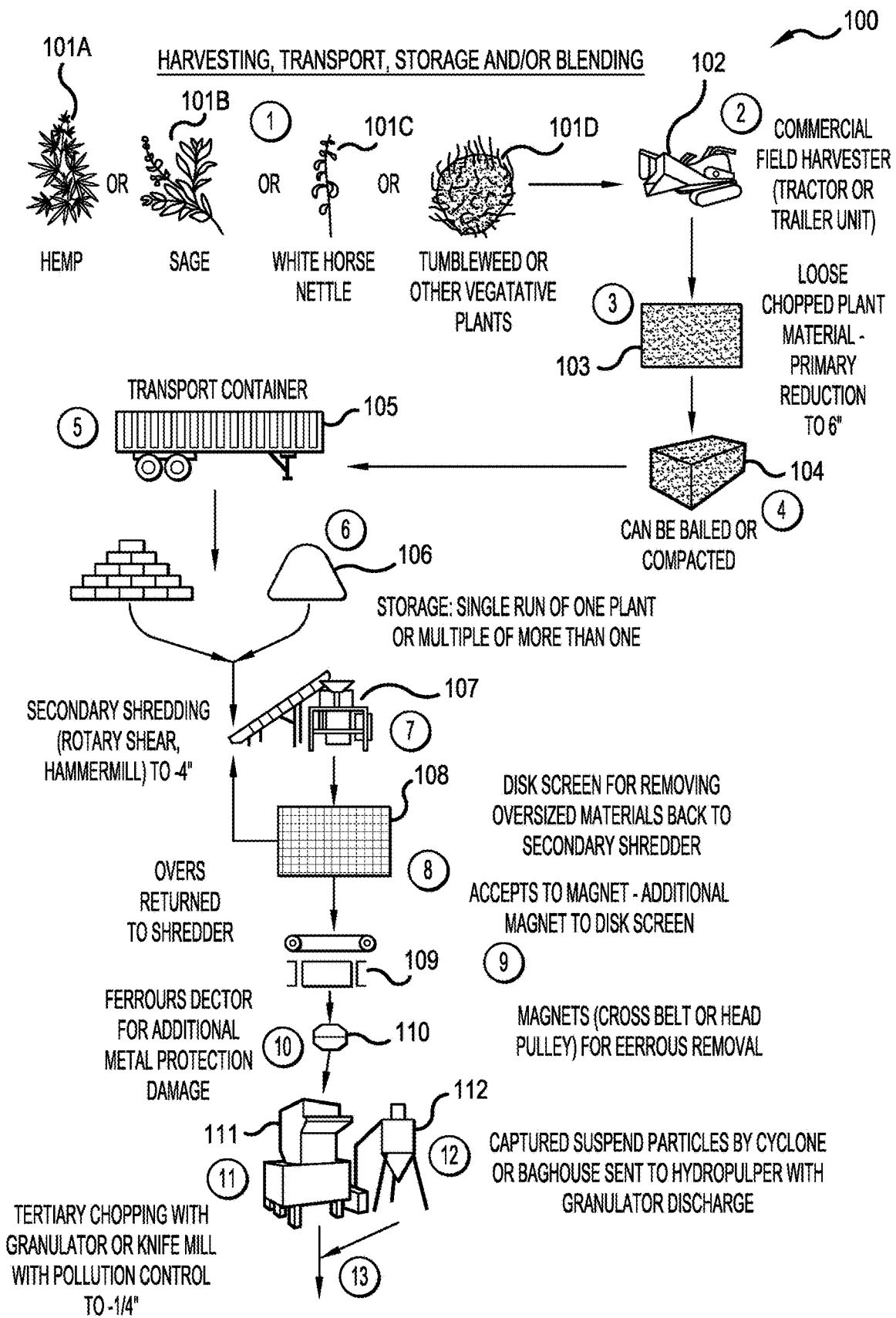
FIGS. 1A thru 1F collectively illustrate a simplified exemplary process for extracting noxious chemicals from naturally-occurring raw materials and converting the raw materials into useful products according to some embodiments. Shown are at least various operations and exemplary equipment for performing the various operations.
Figure 1B:
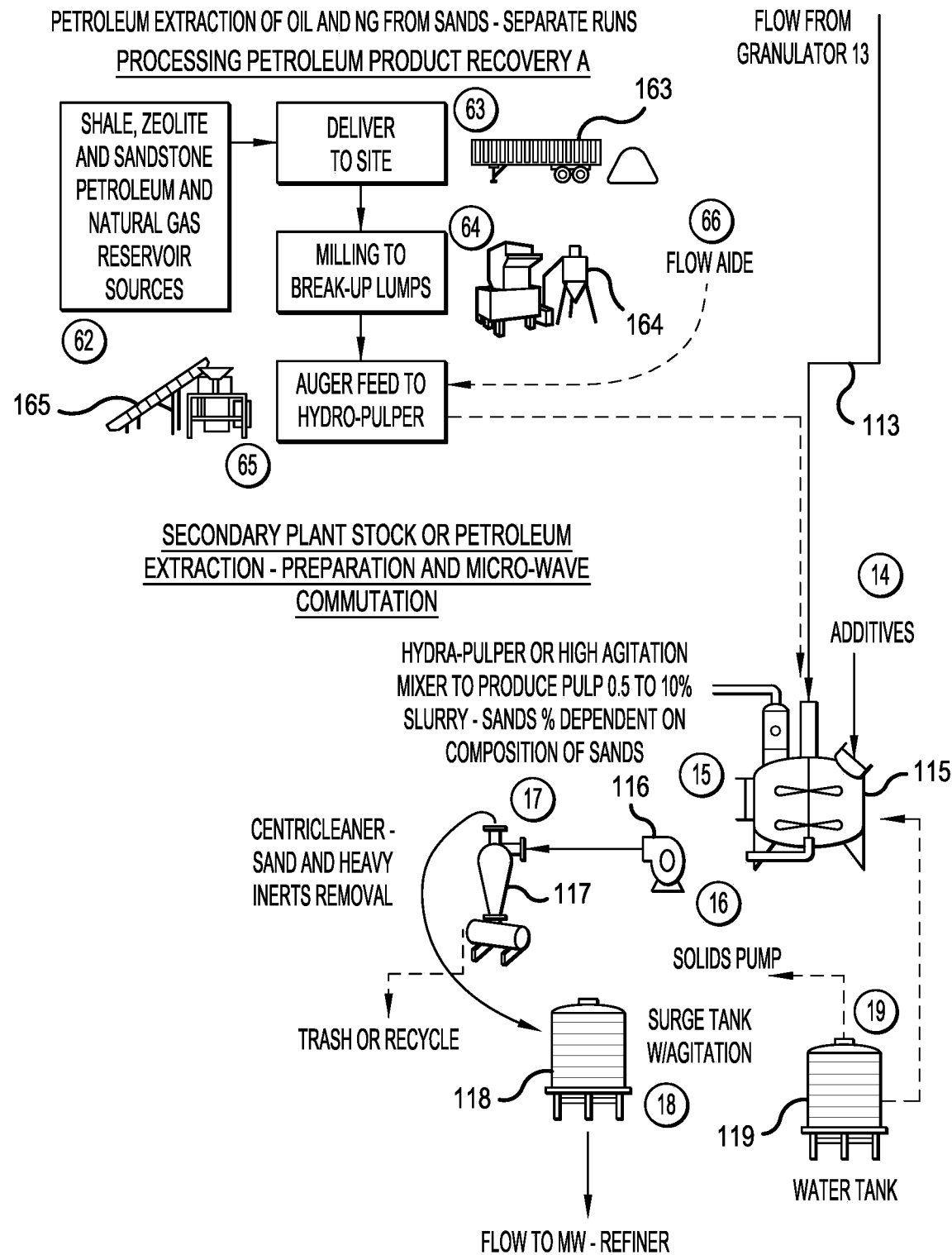

Some embodiments are now described with reference to the above-described figures. In the following description, multiple references are often made to "some embodiments." These references to "some embodiments" are not necessarily referring to the same embodiments, as numerous and varied embodiments are possible. No effort is made to describe all possible embodiments. Sufficient embodiments are described so that those skilled in the art will become appraised of the relevant principles. In addition, disclosed embodiments are not necessarily preferred or advantageous over other embodiments. Accordingly, the scope of the claims is not limited to the disclosed embodiments but instead is limited by the actual language of the claims.

Additionally, in various embodiments those skilled in the art will recognize that various combinations of features are possible. Accordingly, all features described below and referenced in the drawings should be considered optional unless explicitly otherwise indicated. That is, no features should be considered essential unless explicitly indicated.

Invasive and native plants often have toxic elements that greatly affect their efficacy and, in many circumstances, may be a threat to our environment from water absorption, poisoning, and vegetation retardation. This application presents a very unique technology that has been developed to convert these plant species into viable commercial products. It is known that the inherent so-called noxious chemicals in these plants cannot be fully synthesized. The major chemical component can be compounded into a product but with less effectiveness. All the many other smaller amounts of key chemicals contained in these plants are nearly impossible to be added to a commercial product and when so added the results are a reduced efficacy compared to a naturally produced very green product.

An example of a noxious plant is tumbleweed. When tumbleweed is processed and separated into a liquid byproduct and a wet cellulose byproduct, a variety of useful products are possible. The liquid byproducts of this plant can be very positive in the mite infestation elimination, control and reduction of zebra snails, aphids, and spider mites. The extracted chemicals appear to have minimal to no effect on living organisms such as bees. The cellulose byproduct can be refined into feed pellets, gluten-free flour, and used in direct production of ethanol.

These are just a limited sample of the numerous possible products that can be achieved from just tumbleweed using the principles described herein. A fuller listing of possible products from just tumble weed includes pesticides, insecticides, silage, fungicides, cleaners, solvents, feed pellets, oil forms, vector control products, bleaching agents, thermal fluids, and ethanol and alcohol spirits. Some products could be based on oxalic acid. For example, oxalic acid and its other derivatives can be mixed with sweeteners to attract vectors. Sweeteners could be derived from tumbleweed carbohydrates. Some embodiments involve initial processing of plant stocks to form a water slurry in which small particles of the plant stocks are suspended. The slurry with the suspended plant stocks is then processed by exposing the plant stocks to a particle reduction by passing the plant stocks suspended in the slurry between flat grinding disks plant stocks to micron and submicron particles in microseconds, thus exposing the whole fiber structure of the plant stocks to release their inherent chemicals instantaneously and at the same time fiber cell structure of the plant stock is greatly expanded by bombarding the particles with microwaves. The water serves as a useful carrier in which additional additives may be added, thus making the final product's a superior compounded product for various product applications. Ultrasonic wave bombardment can also be incorporated into a process to assist with separating the liquid fraction from the wet fiber. The extracted fiber being the majority of the plant's composition may contain significant properties making the extracted fiber an excellent forage or hay product or supplement. Uniquely native and invasive plants are drought resistant and can be found in abundance, making these plants ideal candidates for farming and for being converted into gluten free flours for human and consumption. The final specific pant can be processed for its particular composition or blended with other processed native or invasive plants to produced and more unique blend product for animal or human consumption.

FIGS. 1A thru 1F collectively illustrate a simplified exemplary process 100 for extracting noxious chemicals, in some cases call oily extracts or other chemical phases, from naturally-occurring raw materials and converting the raw materials into useful products according to some embodiments. Shown are at least various operations and exemplary equipment for performing the various operations. Those skilled in the art will recognize that many combinations of the operations illustrated in FIGS. 1A thru 1F are possible. Thus, while operations 1 through 71 are shown, depending upon the starting plant stock and the desired final products, in many embodiments not all of these operations are needed. The core operations are as indicated in the independent claims, that is the wet-grinding and one or more of the microwave operations discussed below. Otherwise, the operations described below are optional, non-essential, and may or may not be included in various embodiments. And it is noted also noted that plant stock from some plant species may be processed without microwave treatment consistent with the principles discussed herein. Uniquely since this is a wet grinding process, exposes the plants' inherent structure, reducing the targeted fiber wall structure thickness and increases porous surface area for more efficiently removing or separating the targeted chemical(s). Additional solvents can be part of the slurry to target the specific chemical constituent also with the other thermodynamic properties such as heating, cooling, atmospheric process conditions. In the case of hemp and sagebrush the cannabinoids and terpenes common to these plants re more readily removed with the use of selected alcohols. Microwaves can further facilitate the internal cell structure to expand the targeted chemical substance or molecules to expand using the dynamics of coefficient of extension of the targeted noxious chemical to facilitate their release from the plants fiber without interfering with the plant's inherent nutrients.

Indeed, all operations should be regarded as optional. Additionally, although an order or sequence of operations is illustrated, this is not intended to be binding. Again, in many embodiments, depending upon the starting plant stock at the not all of these operations are needed. And they may be performed in sequences other than those shown.

As noted, FIGS. 1A thru 1F also illustrate exemplary equipment that may, in some embodiments, be used to carry out the various operations. The exemplary equipment illustrated are merely examples. Those skilled in the art will recognize that dependent upon a variety of factors, such as conditions in the field, the plant stock being started with, and the desired final product, it may be possible to substitute similar or different equipment for that shown for a particular operation.

Additionally, some of the operations shown in FIGS. 1A thru 1F are applicable to processing plant stock and its derivatives, others are applicable to processing reservoir materials for natural gas and petroleum recovery, and other operations are applicable to both. For ease of discussion and to avoid confusion, this document will first discuss the operations applicable to processing plant stock. Operations applicable only to reservoir material processing will then be discussed.

A. Processing of Plant Stocks

Referencing FIG. 1A, in some embodiments, in Operation 1 invasive, native, toxic, or poisonous plants such as one or more of hemp 101A, sage 101B, white horse nettle 101C, or tumbleweed 101D, or other vegetative plants may be grown or identified. In some embodiments, a single species like tumbleweed may be harvested.

Operation 2 may include at least harvesting of one or more plant species. In some embodiments the harvesting is performed with a commercial field harvester 102, including conventional tractor harvesters or trailer units. In some embodiments a single species such as tumbleweed is harvested alone. In other embodiments multiple species may be harvested. Example tumbleweed plus one or more of hemp 101A, sage 101B, white horse nettle 101C. In some cases, disturbing the land or nature area to be harvested, aerial techniques may be employed.

Operation 3 may include primary reduction. This includes chopping the plant stock to a size of approximately 1 to 6 inches to yield reduced plant stock 103.

Operation 4 may include at least one of bailing or contacting the plant stock to produce bailed or compacted plant stock 104. Additionally, due to the sensitivity of the plant's nature after harvesting: ultraviolet light, microwave or selected non-intrusive gas treatment and controlled atmospheric conditions may be employed to prevent the targeted plants cellular deterioration.

Operation 5 may include transporting the plant stock, for example in a transport container 105. Additional if drone technology tis employed, the harvesting process can be significantly improved, reducing potential time decay of the plants composition.

Operation 6 may include storing the plant stock either in a single run of one plant or multiple of more than one type of plant. Stored plant stock 106 may be stored open or closed depending on, for example, product deposition.

Operation 7 may include secondary volume reduction. This may include at least one of shredding, grinding or other volume reduction with secondary reducing equipment 107 (e.g., a rotary shear, a compactor, granulator, chipper, pulvizer, or a hammer mill, or other reduction equipment). Secondary reducing equipment 107 may also be equipped or associated with ferrous recovery removal devices to prevent damage to writing units and overall contamination.

Operation 8 may include at least using a screen or disk separator 108 (e.g., disk screen) to remove oversized or stringy branches or lambs back to secondary volume reduction to optimize size reduction efficiency.

Operation 9 may include at least magnet detection with magnetic detector 109 to remove any potential ferrous objects to prevent damage to process equipment downstream.

Operation 10 may include at least using additional magnets 110 (e.g., cross belt magnet or magnetic head pulley) for ferrous removal of small or previously un-removed ferrous objects.

Operation 11 may include at least tertiary reduction of secondarily reduced plant stock by tertiary reducing equipment 111 (e.g. granulator, a grinder, or knife mill) with pollution control. Tertiarily reduced plant stock is of a size and weight suitable for wet-grinding (operation 20) below.

Operation 12 may be performed concurrently with Operation 11 and they include capturing air-suspended particles with air cleaning system, fluid bed, 112 (e.g. cyclone or baghouse). Since the tertiary reduction equipment will generally be incorporating an air sweep system using open rotor design, the air carrier passing through the tertiary reduction equipment (e.g., a grinder) should be captured and cleaned with a cyclone or baghouse or a combination of both. The capture particles are then recombined with the outflow tertiary reduction equipment 111.

Operation 13 may include at least transporting tertiarily reduced plant stock via conveyancing equipment 113 (e.g. piping) to mixing apparatus 115.

Operation 14 may include at least adding any additives to tertiarily reduced plant stock. Types of additives are dependent upon the plant stock being processed and the end product desired. Cyclonic centri-cleaner with magnet for removal of unwanted innards and metal from the process downstream may be used.

Operation 15 may include at least mixing plant stock with water to form slurry with a mixing apparatus 115 (e.g., hydra-pulper or high agitation mixer). In some particular embodiments, Operation 15 includes at least mixing dry material with an appropriate water percentage. The appropriate water percentage varies dependent upon the species of plant stock being processed. In some embodiments, sufficient water is added to create a slurry that is between 0.5 and 10 percent by weight. In some embodiments, vapors that are emitted during this stage of the process will be captured and sent to vapor recovery unit (See operation 25 below).

Operation 16 may include at least pumping the slurry with a high pressure head slurry pump 116, ultimately to the wet grind or microwave operations described below.

Operation 17 may include at least removing sand or dirt or similar contaminants from the slurry along with any nonferrous metals such as copper or aluminum. In some embodiments this is performed with centri-cleaner 117.

Operation 18 may include at least making adjustments for flow or process fluctuations in the slurry flow being pumped via operation 16 above. In some embodiments operation 18 is performed with a surge tank with agitation 118.

Operation 19 may include providing water for the wet grinding operation 21 described below. In some embodiments operation 19 is performed with water tank 119. In some embodiments operation 19 is performed in parallel with operations 17 and 18 described above.

Operation 20 may be performed with microwave unit 120 and includes first stage microwave treatment of the slurry with coils inside a microwave chamber. The slurry is treated during a continuous flow of the slurry through the coils. His embodiments, instead of coils, a ceramic constructed tray system may be used inside microwave depending upon the material being processed. This first stage microwave treatment heats and expands plant cells suspended in the slurry for efficient particle commutation in operation 21 below. Some embodiments do not include first stage microwave treatment but instead provide a microwave treatment during or after operation 21. In other embodiments microwave treatment may occur in one or more of operations 20, 21, 22 below. Other embodiments, dependent upon plant species, may not use microwave treatment at all. For some selected plants, microwave treatment may not be necessary.

Operation 21, a wet-grinding operation, may include at least micro-grinding the plant stock suspended in the slurry while it is still in suspension. It is performed with wet-grinding apparatus 121 (see FIGS. 1C and 2). In some embodiments operation 21 also includes microwave treating the slurry during the wet grinding operation (see discussion of FIG. 2). Wet grinding may be performed with either a twin disk or a three-disk arrangement, depending on the final product to be produced. A two-disk arrangement may be one stator stone (a stationary disc) and one rotor disc. A three-disk arrangement may include two stator disks on either side of a rotor disc. In some embodiments, the disks are either made entirely of stone or made of a steel alloy with an attached stone grinding surface. In these embodiments, the disks are said to include stone grinding surfaces. The rotor disk is configured to be driven by a motor drive which may include a tube that also carries a flow of slurry for placement of the slurry onto the stone grinding surfaces. Very high shear may occur due to grinding distances between stone grinding services. During operation, the stone grinding faces are only separated by a thin film of the carrier liquid (often water) of the slurry, thus exposing plant cells suspended in the slurry to the shear of the stone grinding faces. This may rupture plant cells while reducing the size of plant stock material in the slurry to less than 100 microns. It also may cause release of invasive, toxic, and/or poisonous chemicals from the plant cells into the carrier liquid (e.g., water). The carrier liquid may require cooling and or additional heating under a selected operating pressure condition. Additives added to the slurry may assist this wet grinding process.

Operation 22 may be performed with microwave unit 122 and may include a secondary microwave treatment of the slurry similar to operation 20. Microwave unit 122 may be similar to microwave unit 120 except that it is positioned and configured to receive the slurry after operation 21. In some embodiments operation 22 is performed instead of operation 20. In other embodiments operation 22 is performed in addition to operation 20. Either of these operations may be performed in addition or instead of microwave treatment during operation 21. Microwave unit similar to either units 120 or 122 are discussed relative to FIG. 3.

Figure 1C:
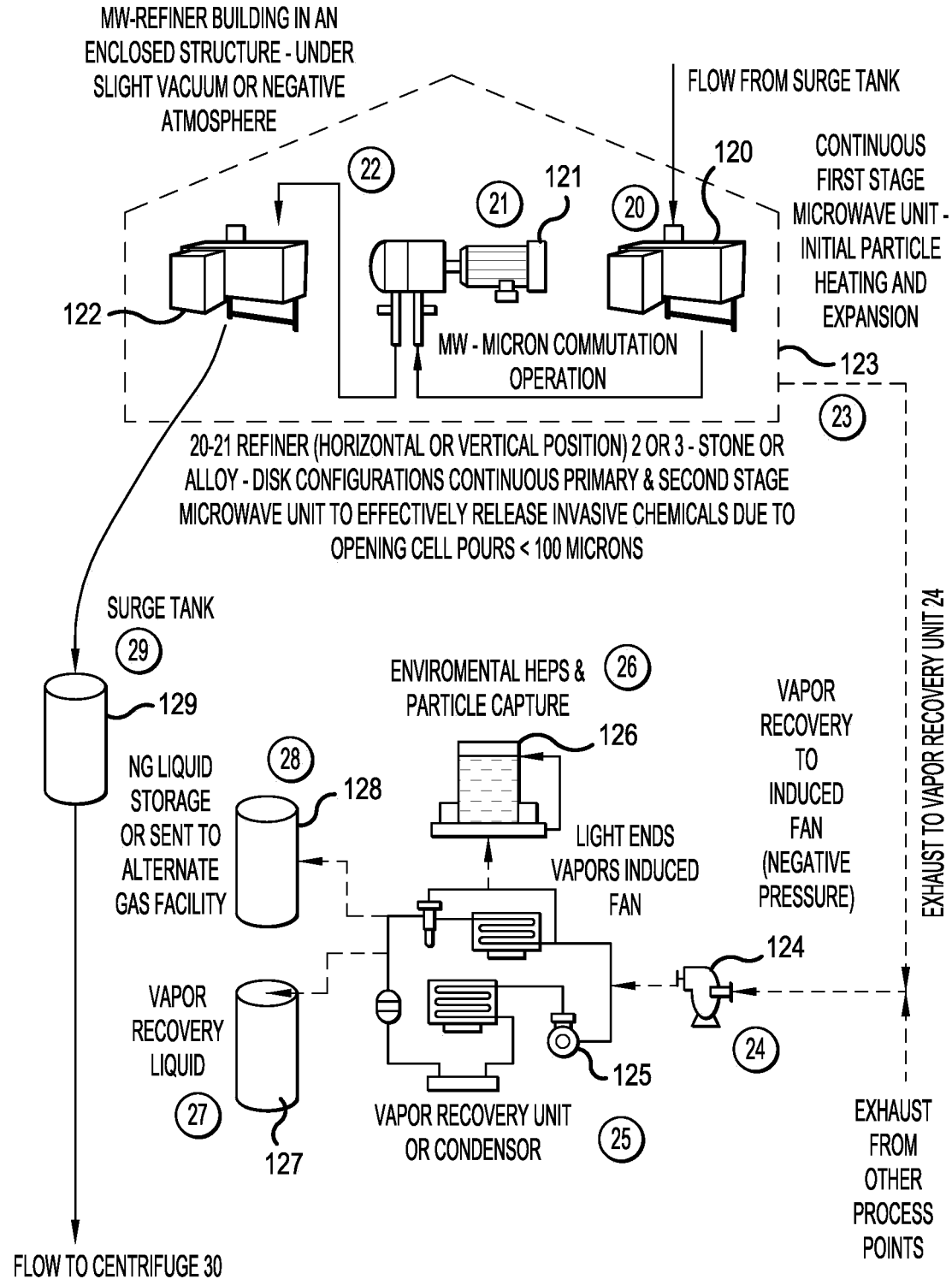
Figure 1D:
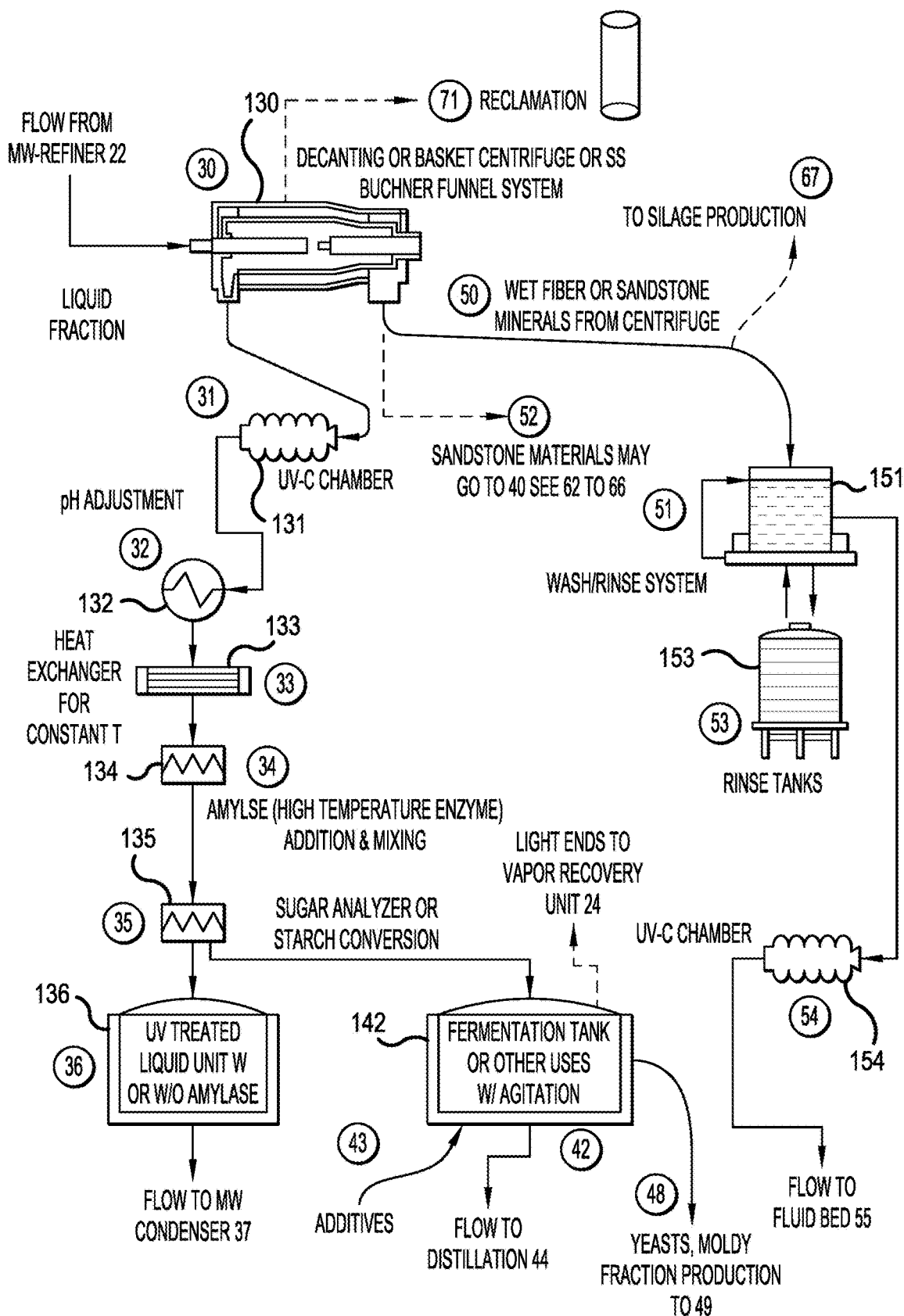

Now described, relative to FIG. 1C, are various operations (23-28) and devices/equipment (123-128) associated with recovery from collective operations 123 (i.e., one or more of operations 120-122).

Operation 23 may include at least collecting vapors off-gassed from one or more of operations 120-122 in one or more containment structures 123 for transporting to vapor recovery unit 125. In some embodiments, one or more of microwave unit 120, wet-grinding apparatus 121, or microwave unit 122 is associated with one or more containment structures 123 configured for capturing off-gassed vapors.

Operation 24 May include creating a negative air pressure in the one or more containment structures and sucking the off-gassed vapors from the one or more containment structures and toward vapor recovery unit 125 (e.g., via one or more of piping, tubing, etc.). Operation 24 is performed with fan 124.

Operation 25 may include at least condensing the off-gassed vapors. This operation is performed with vapor recovery unit 125 (e.g. a condenser).

Operation 26 may include filtering any gases that escape from vapor recovery unit 125 with a HEPA filter 126 or other particle capture.

Operation 27 the recovered liquid from the condensed vapor in storage 127 (e.g a storage container for liquids).

Operation 28 is discussed below relative to petroleum products and processing reservoir materials.

Operation 29 may include at least pumping the slurry (e.g., via pump 116) to a holding tank 129 after the end of collective operation 23.

Operation 30 may include at least receiving process slurry from holding tank 129 and separating at into a liquid fraction and a wet fiber. This operation may be performed with separator apparatus 130 (e.g. one or more of a decanter, a basket centrifuge, or an SS Buchner funnel system). Ultrasonics may be employed with an SS Buchner funnel system to facilitate separation into the liquid fraction and the wet fiber. The liquid fraction may include chemicals such as oxalic acid and/or other plant derived chemicals.

The remainder of the operations to be described include either processing of the liquid fraction or processing of the wet fiber. Processing of the liquid fraction may start with operation 31 and processing of the wet fiber may begin with operation 50. The description below first describes the operations associated with processing the wet fraction, beginning with operation 31. The description then returns to operation 50 and the describes processing of the wet fiber.

1. Liquid Fraction Processing

Operation 31 may include at least subjecting the decanted liquid fraction with ultraviolet light (at least in ultraviolet chamber 131 with an ultraviolet emitter) on a continuous basis to kill germs or prevent growth of bacteria. In some embodiments the author of life is UV-C. In some embodiments the wavelength of the ultraviolet light is between 100 and 3000 nanometers. In some operating conditions a selected non-invasive chemical additive may be employed to prevent bacterial growth.

Operation 32 may include at least adjusting, via pH adjustment equipment 132 (e.g. an additive mixer) of the liquid fraction by adding or mixing acidic or caustic additives.

Operation 33 may include at least with a heat exchanger 133 for optimal amylase exchange and effectiveness. Amylase being a high temperature enzyme that requires a optimal temperature range for effectiveness. This operation and operation 34 below may not be performed if amylase is not added—again dependent upon desired end products and beginning raw materials.

Operation 34 may include at least adding amylase to the now heated liquid fraction with inline mixer 134. This operation may include metering and dispersing amylase type products.

Operation 35 may include at least analyzing sugars in liquid fraction for viscosity and/or specific gravity. This operation may be performed with analyzing equipment 135. Dependent upon the desired end product, the liquid fraction may be diverted to operation 42 (fermentation) described below.

Operation 36 may include at least storing, in storage 136, ultraviolet-treated liquid fraction—which may nor may not include amylase.

Operation 37 may include at least concentrating the liquid fraction into concentrated densities and concentrated fractions with liquid concentrator 137, which includes treatment with microwave radiation and ultrasonic waves. Liquids with concentrated densities and concentrated fractions may include concentrated liquids and high viscosity liquids in the form of a syrup or an oil emulsion. The concentration of the liquid may improve economic value and greater efficiency in further processing, for example in operation 41 below for processing into final products such as liquids, syrups, and/or oils. Vapors off gassed from this operation may be transported to vapor recovery unit 25.

Operation 38 may include online mixing with online mixer 138 of additives into the liquid fraction.

Operation 39 may include at least crystallizing the remaining liquid fraction at least in part with microwave crystallizer and granulator 139 to convert the remaining liquid fraction to crystals.

Operation 40 may include packaging and/or final processing of crystals of operation 39 into final products within crystals facility 140. These final products may be a combination of the extracted oxalic derivatives in a sugar form for direct use (e.g., as pesticides, or other pest control) or for re-solubilization for spray applications. This is the final operation for these products.

In Operation 41 concentrated liquids and high viscosity liquids may be received at facility 141 from operation 37 for final packaging as liquid, theory of spirit, and oils. This is the final operation for these products.

Operation 42 may include at least receiving liquid with starches and sugars analyzing operation 35 and fermenting these liquids in fermentation tank 142. In some embodiments fermentation tank 142 provides agitation as well as fermentation. This operation includes converting the liquid fraction (or a portion thereof) into alcohol via starch reduction of plant stock starches to a sugar. Vapors off gassed from operation 42 are transported to vapor recovery unit 25.

Operation 43 may include at least adding additives to fermentation tank 142 while liquid is fermenting in operation 42.

Operation 44 may include at least decanting and distilling the fermented liquid from operation 42 with distiller 144. Off-gassed vapors are transported to vapor recovery unit 125. This operation may produce a distilled liquid which moves to operation 46. This operation also may produce bottoms which are a dry fraction.

Operation 45 may include at least sending the dry fraction from operation 44 to solids stream as a solid waste product.

Operation 46 may include at least receiving ethanol from operation 45. For some of the ethanol is for an ethanol product and this is a final operation. For some other ethanol moves to operation 47.

Operation 47 may include at least producing specialized spirits such as whiskies, brandies, gin and vodka from some of the ethanol from operation 46. This may be a final operation for these products.

Operation 48 may include at least separating yeasts and moldy fraction from fermentation tank 142 and moving towards operation 49. These items may also be reused in operation 42 in further fermentation.

Operation 49 may include at least receiving the yeasts and moldy fraction 149 as final products. This is a final operation for these products.

2. Wet Fiber Processing

Discussion now returns to the processing of the wet fiber produced in operation 30. The discussion begins with operation 50.

Operation 50 may include at least obtaining wet fiber as an output of operation 30 and transporting to operation 51. Alternatively, or additionally, Operation 50 may include at least transporting the wet fiber to operation 67 (transporting to silage production), discussed below.

Operation 51 may include at least washing the wet fiber in a wash system 151. Water may be reused from one or more wash tanks of the wash system 151.

Operation 52 is discussed later regarding petroleum products.

Operation 53 may include at least rinsing the web fiber in rinse system 153 (including at least rinse tanks, as depicted).

Operation 54 may include at least treating washed and rinsed fiber with UV-C radiation (e.g., with ultraviolet (UV-C) chamber 154 configured with ultraviolet emitter) to prevent bacterial growth from the wash and rinse.

Operation 55 may include at least drying the wet fiber with a drying system 155 (including at least one or more of fluid bed, tray drier, rotary drier, microwave, or flash dryers for removal of moisture. Off-gassed vapors from drying operation may be sent to vapor recovery unit 25.

Operations 56 and 57 are discussed below relative to petroleum products.

Operation 58 may include at least adding additives to the dry fiber. Some additives may be from previously processed plant stock.

Operation 59 may include at least mixing additives into dry fiber with mixer 159 (may also include compounding). These additives assist with dispersion of final products.

Operation 60 may include at least receiving output from operation 59 as gluten free powder. This may be a final operation for this final product.

Operation 61 may include at least receiving output of operation 59 and pelletizing it (e.g., with pelletizing and processing unit 161) as one or more of feed pellets or processing into one or more industrial powders. This product may incorporate silage from operation 68 discussed below regarding petroleum products. Incorporating the silage into these products is operation 70.

Operations 62-66 are discussed below relative to petroleum products.

As discussed above, operation 67 may include at least transporting at least some of the wet fiber separated in operation 30 for silage production in operation 68. For at least some of the wet fiber, Operation 67 may be an alternative to operation 50, as discussed above.

Operation 68 may include at least fermenting the wet fiber in an anerobic atmosphere in enclosed silage mixer 168 for conversion of starches to sugar. This conversion of starches to sugars significantly may improve the taste and appeal of this as animal feed and reduction of storage time. Additional solid waste from this process may be added to the silage since obnoxious elements are removed at various operations.

Operation 69 may include at least slowly releasing one or more inert gases (e.g., from gas canister 169) to the bottom of enclosed silage mixer 168 via porous piping or tubing. This introduction of the one or more inert gases into the moist silage improves silage conversion in an anaerobic atmosphere.

Operation 70 may include at least transporting finished silage to pelletizing and processing unit 161 for incorporation into pellets and/or powders. This may be a final operation for these products and the final operation for this process 100. Use of conventional pellet mill. extruder or press preceded by mixing chamber such as a ribbon blender, jacket or not jacketed for temperature adjustments or direct steam may be employed.

B. Processing of Petroleum/Natural Gas Reservoir Materials for Petroleum Products Preliminarily it is noted that reservoir materials composed largely of sedimentary rocks can be processed using many of the same operations as for the plant stock. Often natural gas and oil are found in sedimentary rocks that were formed when grains and mineral particles were deposited by running water and fused together. Because these rocks are cemented together from such small components, they are porous, full of spaces in which energy-rich carbon compounds can settle, later to be liberated in the form of either oil or gas. Processing of reservoir materials begins with operation 62 below. The processing after operation 62 replaces operations 1-13 discussed above relative to processing of plant stock.

Operation 62 may include at least extracting reservoir materials such as shale, zeolite, and/or sandstone from petroleum and natural gas reservoir sources.

Operation 63 may include at least delivering the reservoir materials 164 to a processing site at least in part with transporting equipment 163 (e.g., via conventional oil field transport vehicles or containers).

Operation 64 may include at least milling the reservoir materials 164 with milling equipment 164 (e.g. a hammer-mill type machine followed by a rod ball mill to fluff the materials). Most reservoir materials are very friable and have a consistency of sand and may be oily to touch. These materials are easily milled as discussed above.

Operation 65 may include at least transporting milled materials via transport equipment 165 (e.g., a auger feeder) to operation 15.

Operation 66 may include at least adding a flow aide additive to the milled materials in tandem with operation 65. One flow aid additive could be trace amounts of silica. In other operating conditions such as processing cheat grass, the removal of the inherent silica content may be of benefit to the final product.

Operation 15 is discussed above relative to processing of plant stocks and applies similarly here regarding petroleum materials. An amount of added water (or other carrier liquid) may vary dependent on composition of sands. Accordingly, the percentage of sand by weight of the slurry may also vary.

After operation 15, processing of the reservoir materials proceeds to operations 16, and 18-30 with modifications as discussed below. Unless otherwise indicated these operations are unchanged from as discussed above relative to plant stocks. However, in some embodiments operation 17 is not used for processing reservoir materials.

At one or more of operations 20-22, slurry is processed as discussed above. Combination of microwave treatment, wet-grinding, liquid temperature control, separation additives, and ultrasonics reduces suspended particles in the slurry to 100 microns or less and causes release of petroleum chemicals in the suspended materials. These operations may yield an off-gassed vapor including at least natural gas. This vapor is transported for processing according to operations 24-27 as discussed above. Additionally, at operation 28, natural gas that is condensed from the vapor may be stored (e.g., in tanks 128) from where it can be transported to a natural gas facility.

After processing in one or more of operations 20-22 the processed slurry moves to operation 29 as discussed above and then to operation 30.

Operation 30 proceeds as discussed above. With respect to the processed reservoir materials, operation 30 yields a liquid fraction that may include at least petroleum, a dry fraction that includes at least sand and other reservoir materials. For the wet fraction, processing moves to operation 71 reclamation, for example with reclamation tank 171. For the dry fraction, processing moves via a transport operation 52 to operation 40 where crystals and other materials are a final product and processing ends. Alternatively, processing for the dry fraction moves to operations 56 (transport) and 57 (drying of sandstone, zeolite, and similar materials with drying system 155) an end operation. Optionally, processing for the sandstone, zeolite, and similar materials may include operations 51 and 53 (wash and rinse), discussed above, and then to operation 57.

An exemplary wet-grinding apparatus 201 is now discussed with reference to FIG. 2. As is explained below, this wet-grinding apparatus includes one rotary disk 210 and one stator disk 209 or more disk combinations for increased production or output. This embodiment may be compared with the wet-grinding apparatus of FIG. 4 which may include two stator disks.

Figure 2:
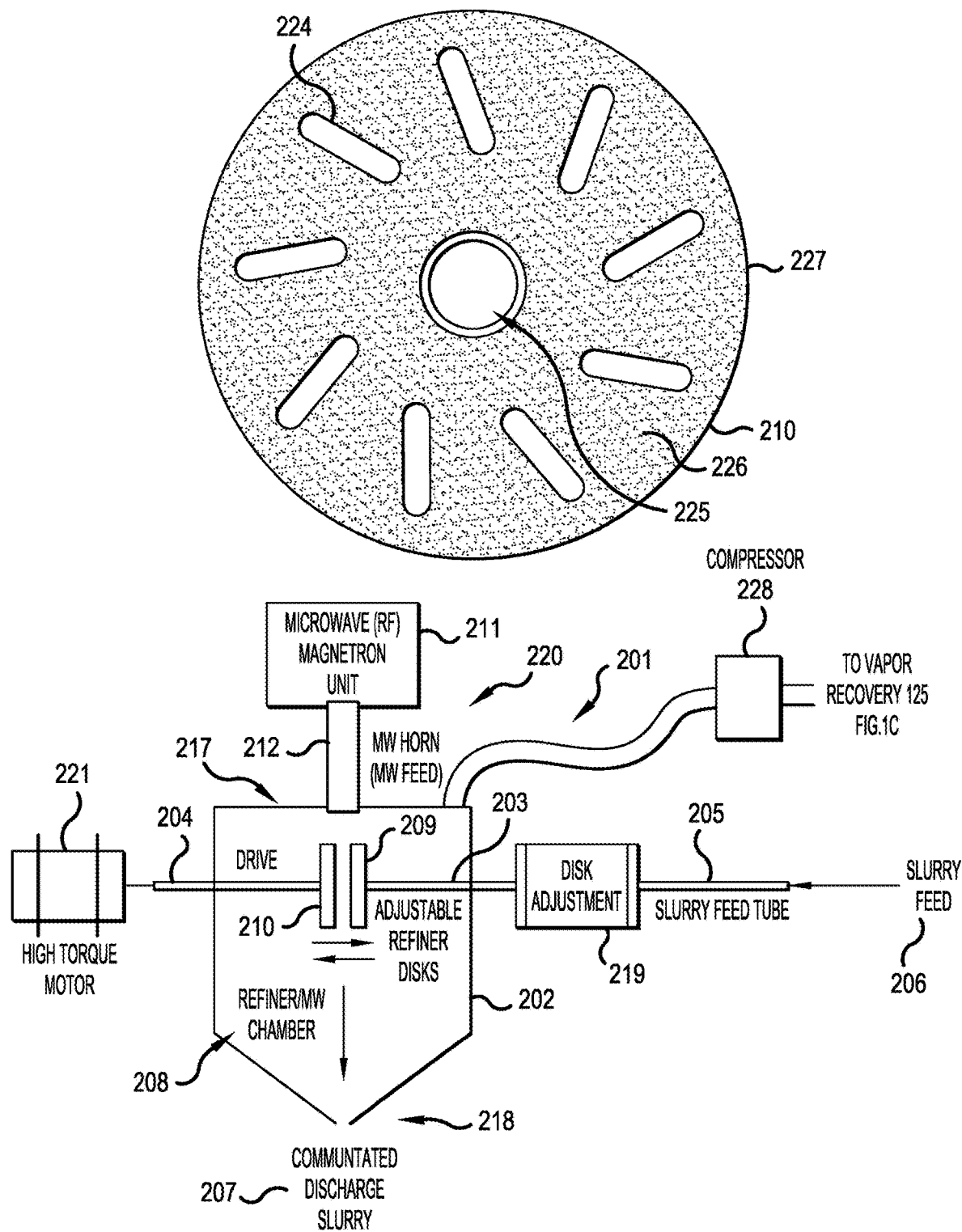
FIG. 2 is a simplified schematic diagram, consistent with some embodiments, of a wet-grinding apparatus with a rotary and a stator disc, an attached microwave.

Referencing FIG. 2, a wet-grinding apparatus 201 may include at least a fluid conveyance 205 (e.g., slurry feed tube as shown) configured for receive and direct a slurry flow 206 (e.g., slurry feed) that contains at least one or more carrier liquids and at least suspended plant stock.

The exemplary wet-grinding apparatus 201 further may include at least a high torque motor 221 (refiner motor as shown) and a motor drive 204 operably coupled to be driven by the high torque motor 221.

The exemplary wet-grinding apparatus 201 may further include at least a set 217 of flat grinding disks (e.g., stator disk 209 and rotor disk 210) that include at least one rotary disk 210 that is operably coupled to be driven by the motor drive 204 and that are configured, when the at least one rotor disk is receiving power via the motor drive, to accept the slurry flow 206, to grind the suspended plant stock (e.g., plant parts 703 of FIG. 7), and to discharge the slurry flow 206. In the exemplary wet-grinding apparatus 201 conveyance 205 is coupled with disk adjustment 219 and with stator disk 209. Disk adjustment 219 adjusts a length of a portion 203 of conveyance 205 that determines how close stator disk 209 is to rotor disk 210. When in operation only a thin layer of slurry should separate disks 209 and 210. Slurry may then escape from conveyance 205 between disks 209 and 210 for grinding of the suspended plant stock between disks 209 and 210.

The exemplary wet-grinding apparatus 201 may further include at least a fluid outflow 218 configured to receive the discharged ground slurry flow 207 and to evacuate the ground slurry 207 (e.g., a commutated discharge slurry) flow to outside the wet-grinding apparatus 201.

The exemplary wet-grinding apparatus 201 may further include at least a microwave unit 220 that includes at least a microwave emitter 211 (e.g., a microwave (RF) magnetron unit) configured to emit microwave radiation toward the slurry (e.g., with microwave horn 212 (MW feed). Microwave radiation and off-gassed vapor are contained within chamber 208 by containment structure 202. Off-gassed vapors are captured via negative atmospheric pressure within containment structure 202 by compressor 228 and directed toward vapor recovery unit 125 (e.g., at least a condenser).

FIG. 2 further illustrates an enlarged side view of rotor disk 210. However, the structures shown would be at least similar for stator disk 209. Rotor disk 210 includes an axial hole 225, a grinding surface 226, an outer perimeter 227, and grooves or slots 224 for assisting flow of slurry over the grinding surfaces 226. In some embodiments grooves or slots are not present as they are not needed for processing of some raw materials.

Figure 3:
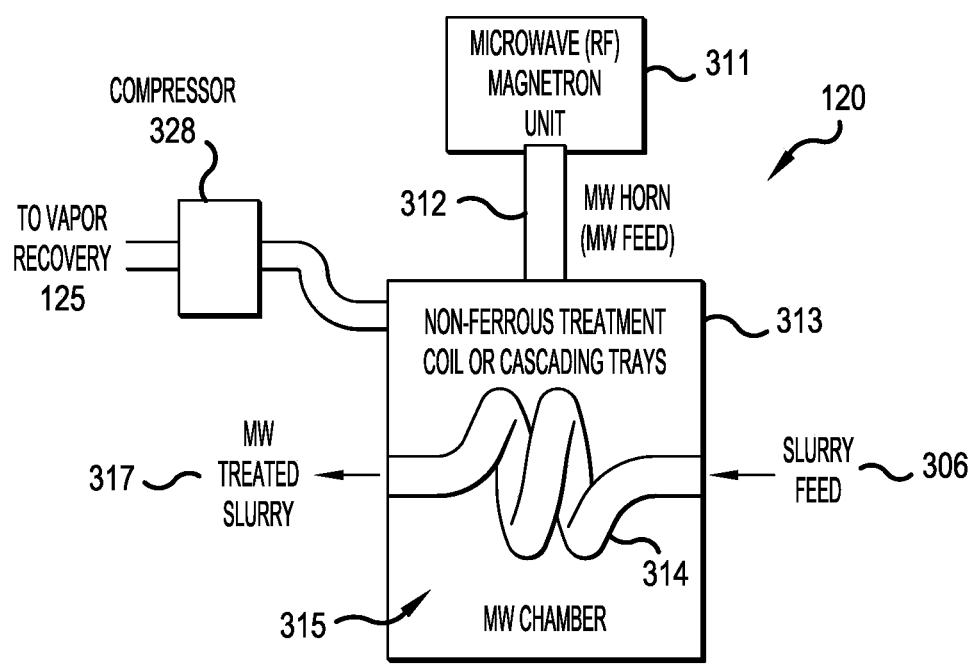
FIG. 3 is a schematic diagram, consistent with some embodiments, of a standalone microwave for treating slurry with microwave radiation. Shown are at least a microwave magnetron unit, a microwave chamber, and a non-ferrous treatment coil. Another is the employment of super cooling or heating to facilitate chemical conversion or extraction.

Referencing FIG. 3, an exemplary standalone microwave unit 120 is shown. Standalone microwave unit 120 is configured to provide microwave treatment in operation 20 of process 100 discussed above. Microwave treatment can be a combination of treatment prior to and after the microgrinding unit. But standalone microwave unit 120 could also function as microwave unit 122 to perform operation 22.

Figure 4:
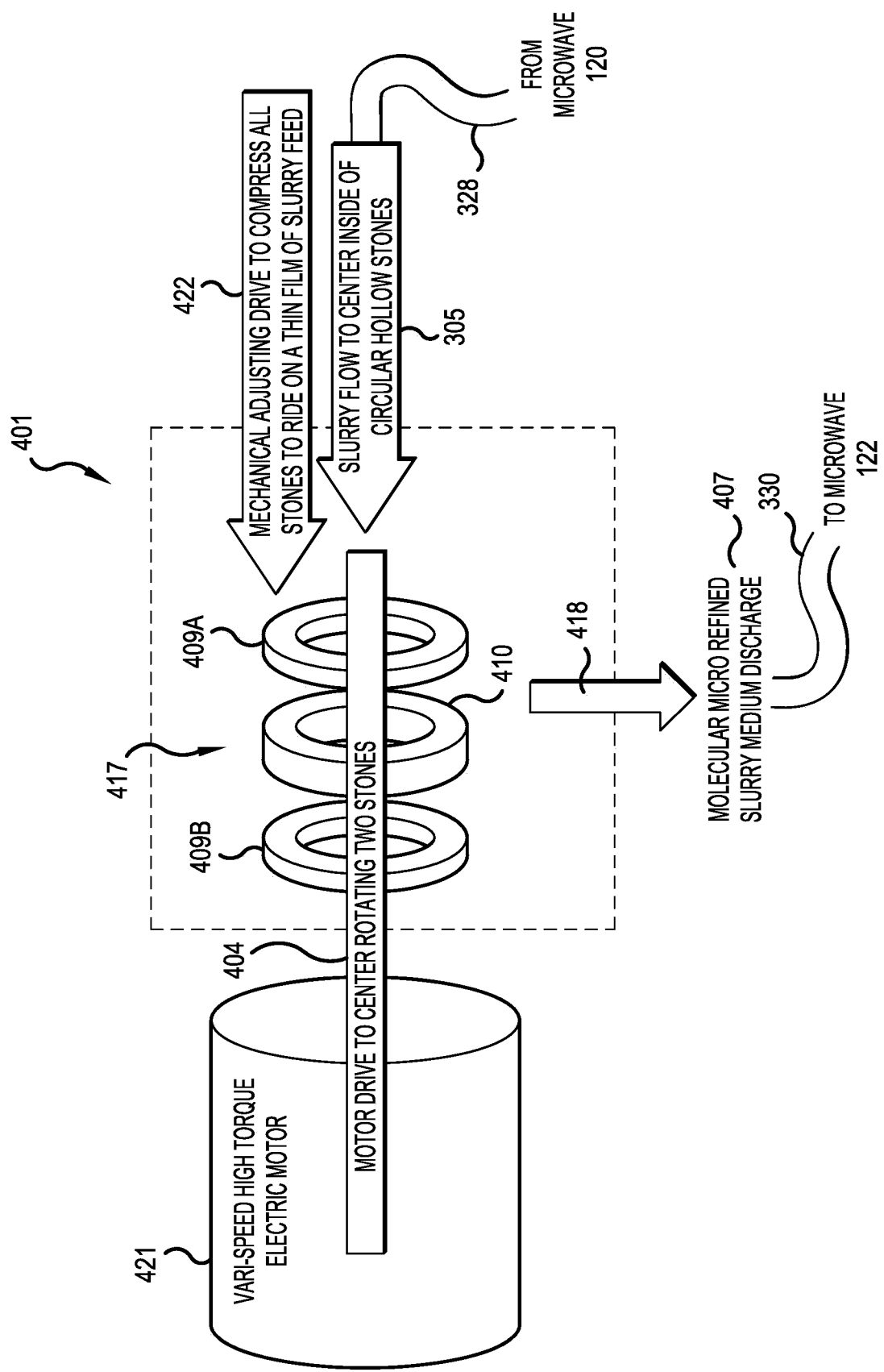
FIG. 4 is a schematic diagram, consistent with some embodiments, of a wet-grinding apparatus with one rotary disk and two stator disks or more combinations say 3-dicks in the refiner for wet-grinding a slurry, the wet-grinding apparatus including a magnetron unit and an encasement for wet-grinding and microwaving slurry. Shown in simplified form are at least components of the wet-grinding apparatus, including an exemplary disk with grooves to facilitate commutation or particle sizing.

In some embodiments, an exemplary microwave unit is separate from a wet-grinding apparatus (e.g., 201 or 401 of FIG. 4).

The exemplary microwave unit 120 includes at least one or more high temperature-resistant conveyances 314 (e.g., tubes or pipes as shown, but could also be trays) that include at least one of tubes, coils, or troughs that are transparent to microwave radiation and that are further configured for receiving and conveying the slurry flow (e.g., slurry feed 306 and microwave-treated slurry 317).

The exemplary microwave unit 120 may include at least a microwave emitter 311 positioned to emit microwave radiation toward (e.g. via microwave horn 312) at least a portion of the one or more conveyances 314. The emitter 311 being coupled with microwave horn 312 for aiming the microwave radiation. The one or more conveyances 314 being at least partially disposed with a microwave containment structure 313 defining a chamber 315 for containing the microwave radiation and vapors off-gassed from slurry. Compressor 228 is configured for creating a negative atmosphere within chamber 313 and for siphoning off-gassed vapors toward vapor recovery 125 (e.g., of FIG. 1C).

It being noted that when the microwave emitter is in operation the emitted microwave radiation may cause cells 723 of the ground plant stocks within the one or more conveyances to expand thereby making a wet-grinding more effective (See discussion regarding FIG. 7 below).

An exemplary wet-grinding apparatus 401 is now discussed with reference to FIG. 4. As is explained below, this wet-grinding apparatus includes one rotary disk 410 and two stator disks 409A and 409B. This embodiment may be compared with the wet-grinding apparatus of FIG. 2 which includes one stator disks. This embodiment also differs from the wet-grinding apparatus 201 of FIG. 2 because it does not include a built-in microwave unit 220. Instead, it includes a feed 328 from a microwave unit 120 and a feed 330 to microwave unit 122.

Referencing FIG. 4, a wet-grinding apparatus 401 may include at least a fluid conveyance 305 (e.g., slurry flow bringing microwave unit 120 of FIG. 3) configured for receive and direct a slurry flow that contains at least one or more carrier liquids and at least suspended plant stock (in some embodiments between 1% and 25% suspended plant stock by weight).

The exemplary wet-grinding apparatus 401 further may include at least a high torque motor 421 (e.g., a vari-speed high torque electric motor) and a motor drive 404 operably coupled to be driven by the high torque motor 421.

The exemplary wet-grinding apparatus 401 further may include at least a set 417 of flat grinding disks (e.g., stator disks 409A and 409B and rotor disk 410) that include at least one rotary disk 410 that is operably coupled to be driven by the motor drive 404 and that are configured, when the at least one rotor disk is receiving power via the motor drive 421, to accept the slurry flow, to grind the suspended plant stock (e.g., plant parts 703 of FIG. 7), and to discharge the slurry flow. In the exemplary wet-grinding apparatus 401 mechanical adjusting drive 422 is configured to compress all disks (e.g., stator disks 409A and 409B and rotor disk 410) to ride on thin films of slurry. When in operation only thin layers of slurry should separate stator disks 409A and 409B and rotor disk 410. Slurry may then escape from conveyance 305 between stator disks 409A and 409B and rotor disk 410 for grinding of the suspended plant stock between 409A and 409B and rotor disk 410.

As discussed above, in some embodiments one or more of stator disks 409A and 409B and rotor disk 410 are composed of a steel alloy. In other embodiments one or more of stator disks 409A and 409B and rotor disk 410 are composed of stone or stone-like materials such as silicon carbide, aluminum oxide, zirconia, or ceramic friable mixes. In some applications the disks could be fabricated from metals with designed groves to facilitate commutation. In some embodiments one or more of stator disks 409A and 409B and rotor disk 410 are composed partly of a steel alloy, but with an attached stone facing to provide the grinding surfaces.

The exemplary wet-grinding apparatus 401 further may include at least a fluid outflow 418 configured to receive the discharged ground slurry flow and to evacuate the ground slurry 407 flow to outside the wet-grinding apparatus 401.

The exemplary wet-grinding apparatus 401 is flowingly coupled (e.g. via feed 328) to receive microwave-treated slurry from microwave unit 120. This exemplary wet-grinding apparatus 401 is additionally flowingly coupled (e.g. via feed 330) to provide ground slurry 407 to microwave unit 122.

Figure 5:
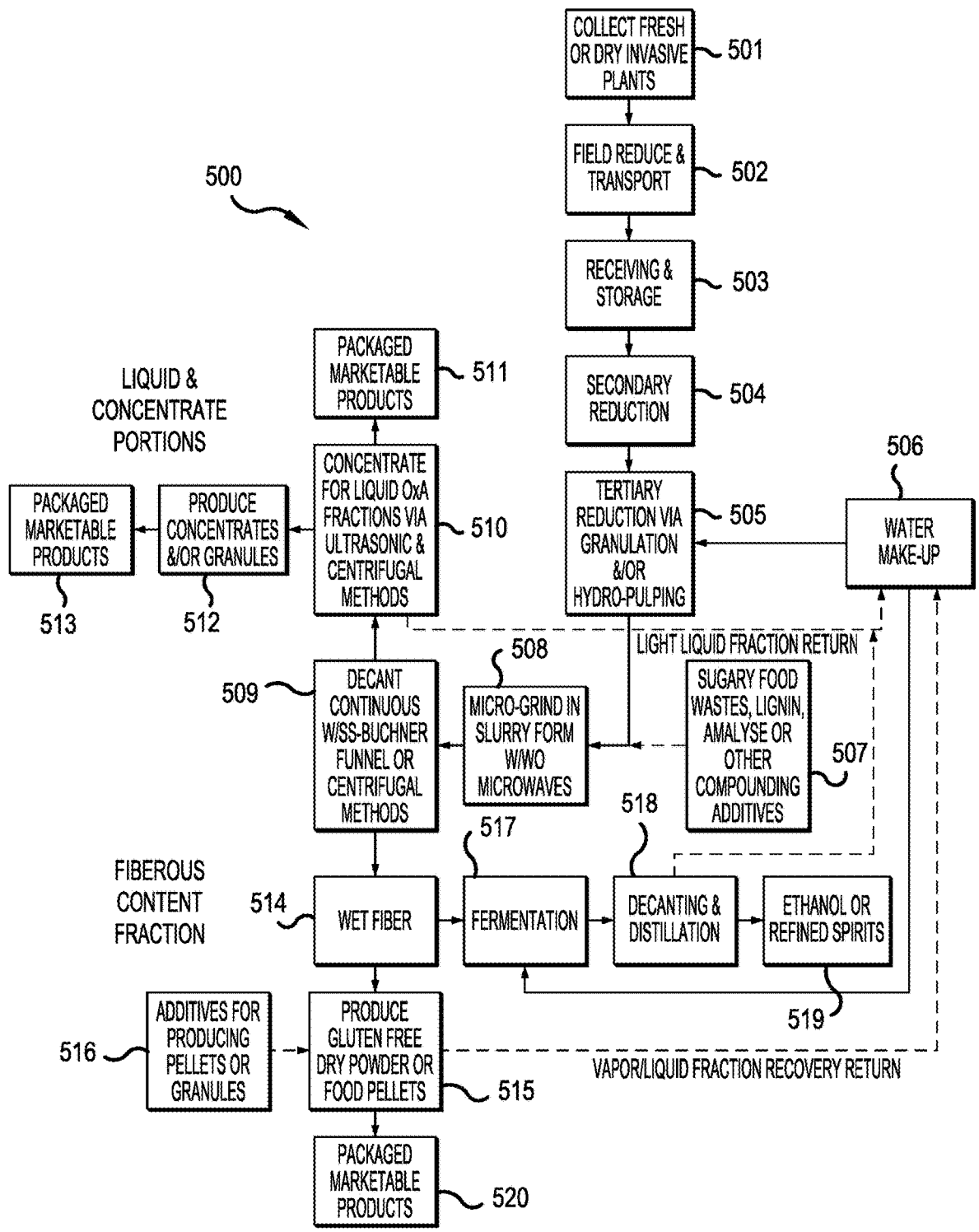
FIG. 5 is a flow diagram showing an exemplary process for extracting noxious chemicals from at least one of invasive or native, a poisonous or toxic plant stock and converting the plant stock and the extracted noxious chemicals into useful products according to some embodiments.

An exemplary process 500 for processing invasive, poisonous, and/or toxic plants into useful products is now described relative to FIG. 5.

Referencing FIG. 5, operation 501 may include at least collecting at least one of fresh or dry plants. The collected plants could include many invasive and native, poisonous, and/or toxic plants, such as, for example, hemp, sage, white horse nettle, cheat grass, sagebrush varieties, tumbleweed. The collected plants could also include combinations of one or of the above or of other plants.

Operation 502 may include at least field reduction and transport of the collected plants. The field reduction could include primary reduction. In some embodiments primary reduction includes at least chopping the plants to one or more sizes in of approximately ¼ to 6 inches. Transport could include transport via a transport container (e.g., 105 of FIG. 1A)

Operation 503 may include at least receiving and storing the primary reduced plants from operation 502. Stored plant stock may be stored open or closed depending on, for example, product deposition. Additional treatment may require upon receiving the harvested pant material to prevent any deterioration to the plants composition or its properties.

Operation 504 may include at least secondary reduction. This may include at least one of shredding, grinding or other volume reduction with reducing equipment (e.g., 107 of FIG. 1A, which could be a rotary shear, granulator, chopper or a hammer mill, or other reducing equipment know to those skilled in the art). Operation 504 may also include removal of ferrous objects (e.g., ferrous metal debris) with removal equipment (e.g., magnets).

Operation 505 may include at least tertiary reduction with tertiary reduction equipment (e.g., 111 of FIG. 1A), such as a granulator a knife mill. Additionally a hydro-pulper or high agitation mixer is used to add a carrier liquid (e.g., water from operation 506 below) to create a slurry that includes at least tertiarily-reduced and suspended plant stock and the carrier liquid. In some embodiments, this carrier liquid is between 1% and 25% suspended plant stock by weight.

Operation 506 may include at least providing water to a hydro-pulper of operation 505 (discussed above) and/or to fermentation operation 517 (discussed below). Water for operation 506 may be received from one or more of operations 510, 515, 516, or 518 described below. Operation 506 may also include using a vapor recovery system to condense water vapor (produced in one or more of operations 510, 515, 516, or 518) into water.

Operation 507 may include at least adding at least one of sugary food wastes, lignin, amylase or other compounding additives to the slurry. This operation is dependent upon the plant stock being processed and the end products desired and may not be used in some embodiments.

Operation 508 may include at least wet-grinding (e.g., may also be called micro-grinding) the slurry with or without microwave treatment. This operation is at least similar to operation 21 discussed above.

Operation 509 may include at least separating the wet-ground slurry from operation 508 into a liquid fraction and wet fiber. This operation may be performed with separator apparatus 130 of FIG. 1D (e.g., with one or more of a decanter, a basket centrifuge, or an SS Buchner funnel system). The liquid fraction may include chemicals such as oxalic acid or similar acids. The wet fiber may include fibrous plant stock residue. Processing of the liquid fraction moves forward with operation 510 (below) and processing of the wet fiber moves forward with operation 514 below.

Operation 510 may include at least concentrating the liquids, such as liquid oxalic acid, via one or more of ultrasonic wave treatment, microwave radiation, and centrifugal methods. Vapors off-gassed from this operation are transported (e.g., via piping and/or tubing) to a vapor recovery operation associated with operation 506.

Operation 511 may include at least packaging of finished products from operation 510 such as oxalic acid.

Operation 512 may include at least producing at least one of concentrates or granules. These products are packaged in operation 513.

Returning to processing of the wet fiber (process block 514), operation 515 includes producing at least one of gluten-free dry powders or food pellets from at least a portion of the wet fiber produced in operation 509. This operation includes at least drying the wet fiber.

Operation 516 may include at least providing additives for producing, fibers, powders, pellets or granules from operation 515. The extracted noxious chemical constituents may be concentrated for ease of storage and shipment to designated processers such a flour producer, pesticide applications or can be compounded as an extension to the micro-grind system.

Operation 520 may include at least packaging the at least one of gluten-free dry powders, fibers or food pellets from operation 515 into final products.

Operation 517 may include at least fermenting at least a portion of the wet fiber produced in operation 509. Water is added via operation 506. A fermented beverage is produced.

Operation 518 may include at least decanting and distilling the fermented beverage of operation 517.

Operation 519 may include packaging and final preparation of at least one of ethanol and refined spirits.

Figure 1E:
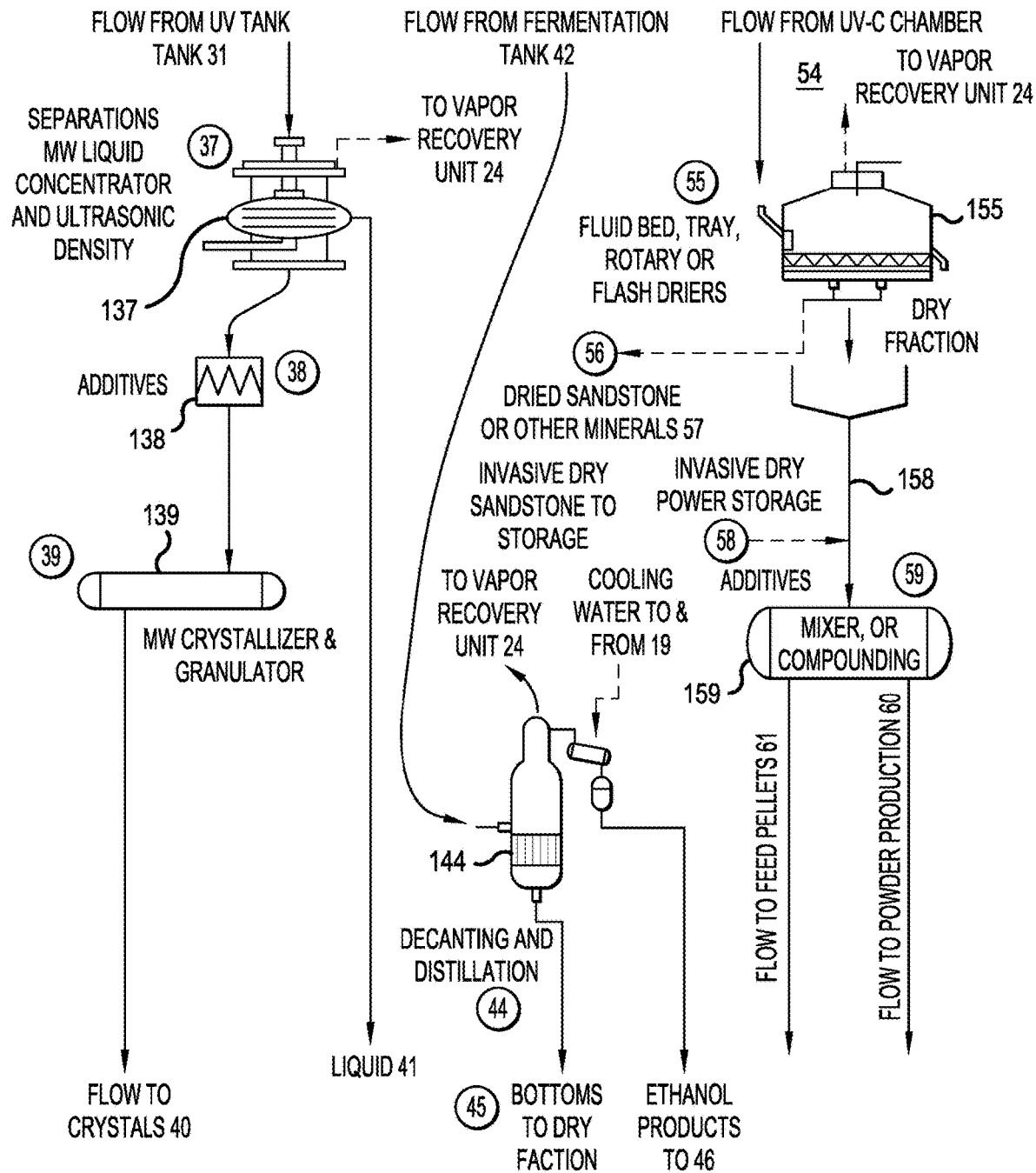
Figure 1F:
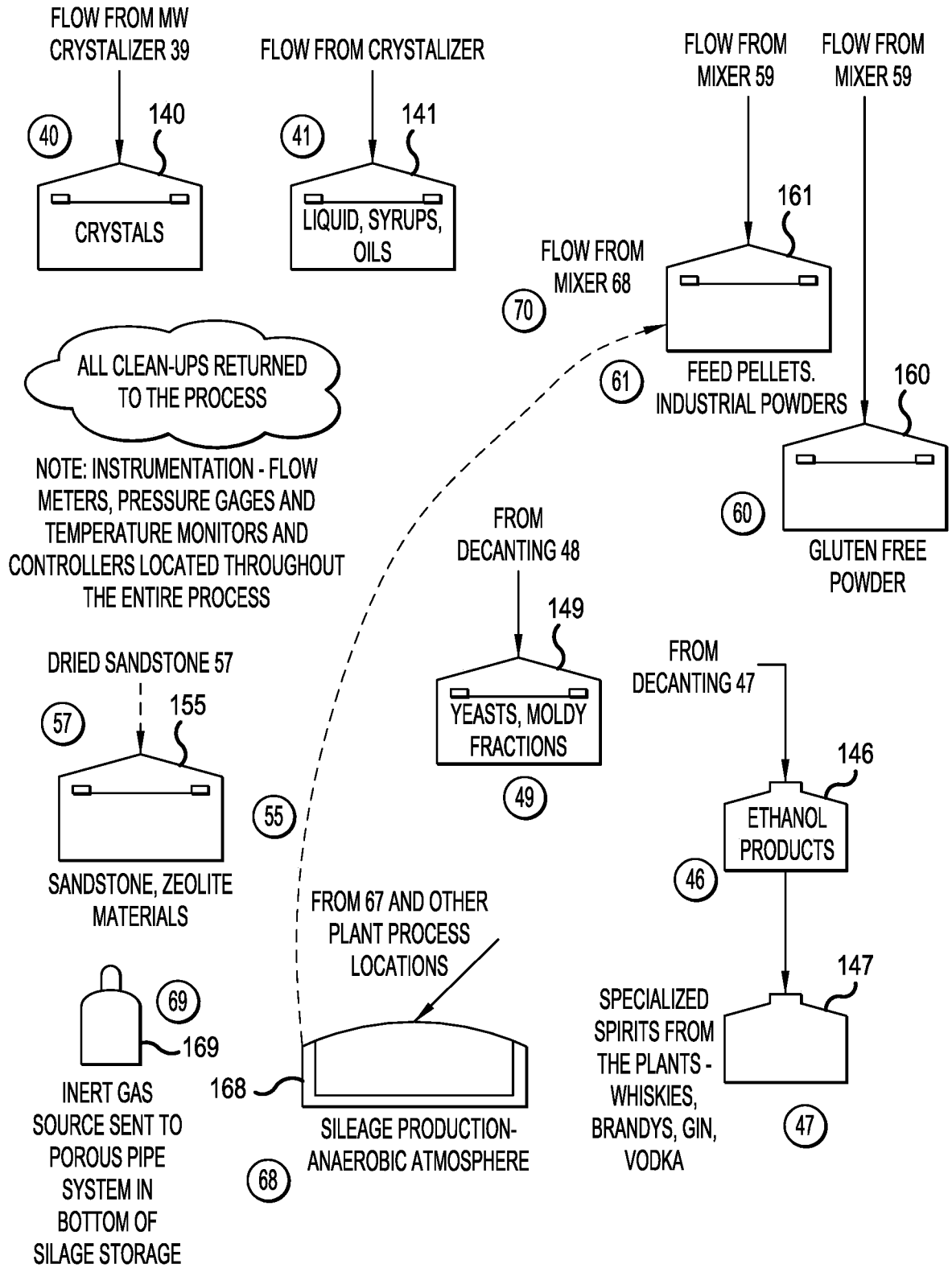
Figure 6:
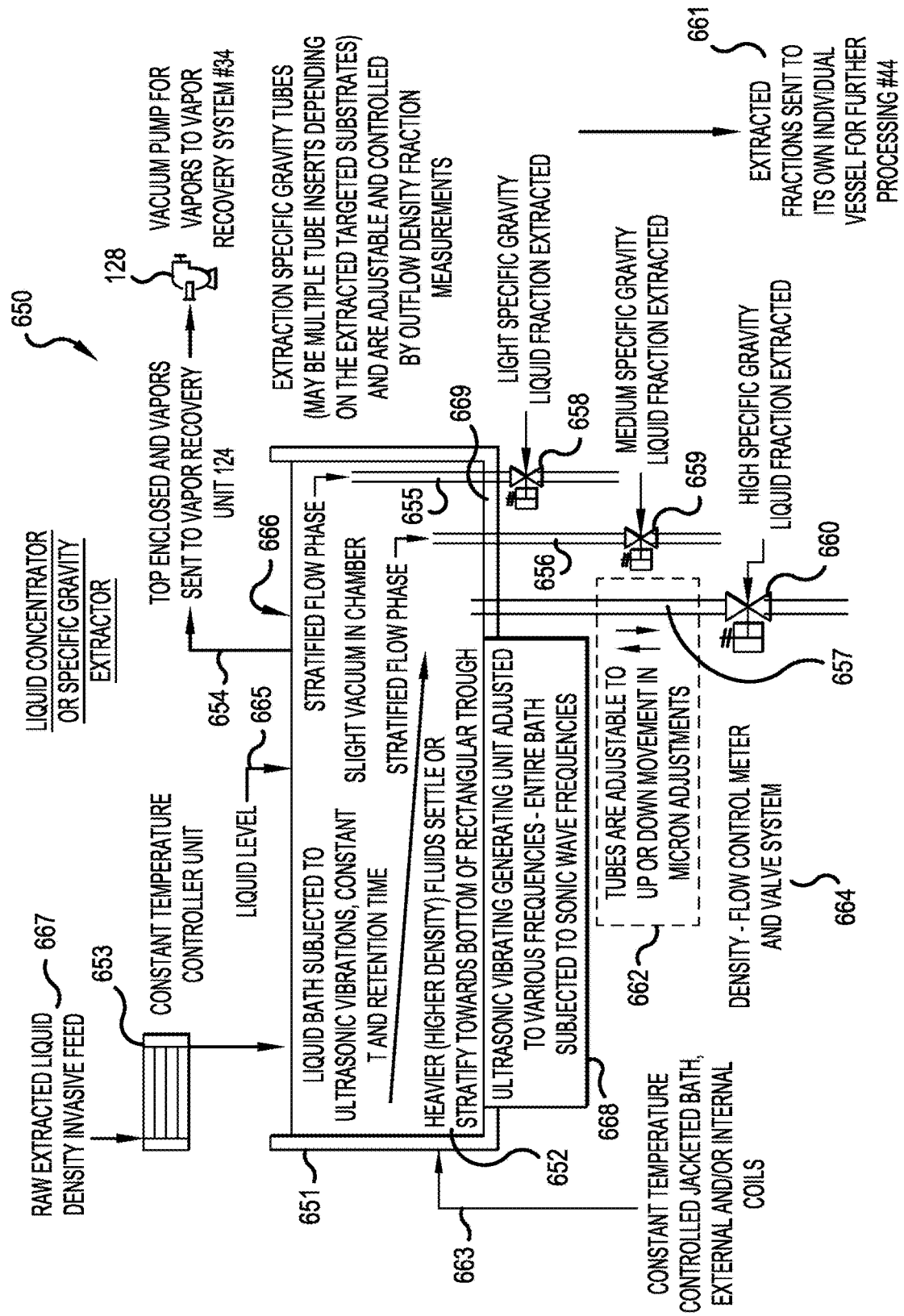
FIG. 6 is a schematic diagram, consistent with some embodiments, of a liquid concentrator or extractor. Shown are at least a bath with evacuation tubes for evacuating different liquids of different specific gravities and may employ ultrasonic vibration.

Referencing FIG. 6, a simplified schematic drawing of an exemplary extractor 650 (also referred to as specific gravity extractor or a liquid concentrator) that may be used in operation 37 of FIG. 1E.

Exemplary extractor 650 may include a tank 651 (e.g., a rectangular trough) filled with a liquid 666 to water level 665. Raw extracted liquid density invasive feed 667 may be added to liquid with temperature of the feed 667 controlled by constant temperature controller unit 653 (e.g., with external or internal heated coils for maintaining constant temperature). An ultrasonic vibrating generating unit 668 produces ultrasonic vibrations of various frequencies. A specific retention time is used.

Referencing feature 663, the combination of the ultrasonic frequencies, the constant temperature, and the retention time result in a stratification of the liquid 666 into lighter and heavier liquids with different specific gravities. Heavier (higher density) liquids settle or stratify towards the bottom of tank 651.

In the particular exemplary extractor 650 showed, there are three submerged vertical drain pipes 655, 656, and 657 for draining liquids of different specific gravities. In the example shown drain pipe 655 is highest relative to floor 669 (for draining lightest specific gravity liquid), drain pipe 656 if of intermediate height relative to floor 669 (for draining moderate specific gravity liquid), and drain pipe 657 is of lowest height relative to floor 669 (for draining heavy specific gravity liquids). Referencing feature 662, each of drain pipes 655, 656, and 657 are of adjustable height (relative to floor 669 of tank 651 by moving up or down relative to floor 669) within a micron of height. Thus, extraction specific gravity tubes 655, 656, 657 (which may be multiple tube inserts depending on the extracted targeted substrates) are adjustable and controlled by outflow density fraction measurements. Additionally, the separated solutions can be siphoned off or centrifuged. Employing ultrasonics at the separation face accelerates light ends polymers from the settled high-density fractions.

Drain pipes 655, 656, and 657 are associated with valves 658, 659, and 660, respectively. That is, valve 658 is configured to extract light specific gravity liquid fractions from drain pipe 655. Valve 659 is configured to extract medium specific gravity liquid fractions from drain pipe 656. And valve 660 is configured to extract high specific gravity liquid fractions from drain pipe 657. Collectively, pipes 655-657 and valves 658-660 are referred to as density-flow control meter and valve system 664. The extracted liquid fractions from valves 658-660 are sent via individual vessel for further processing in, for example, one or more operations after operation 37 of process 100. Conveyance 661 is configured for sending extracted fractions to their own individual vessels for further processing, such as in operation 44 of FIG. 1D. The use of light frequencies such as ultraviolet light can greatly assist in monitoring the separation phases and can be interconnected with this stage of the process.

Exemplary extractor 650 includes an enclosure (not shown) to prevent escape of water vapors that evaporate from water 666 of tank 651. A pump 128 may provide suction to move the captured water vapors via conveyance 654 to a vapor recovery system (e.g., vapor recovery unit 125 of FIG. 1C).

Figure 7:
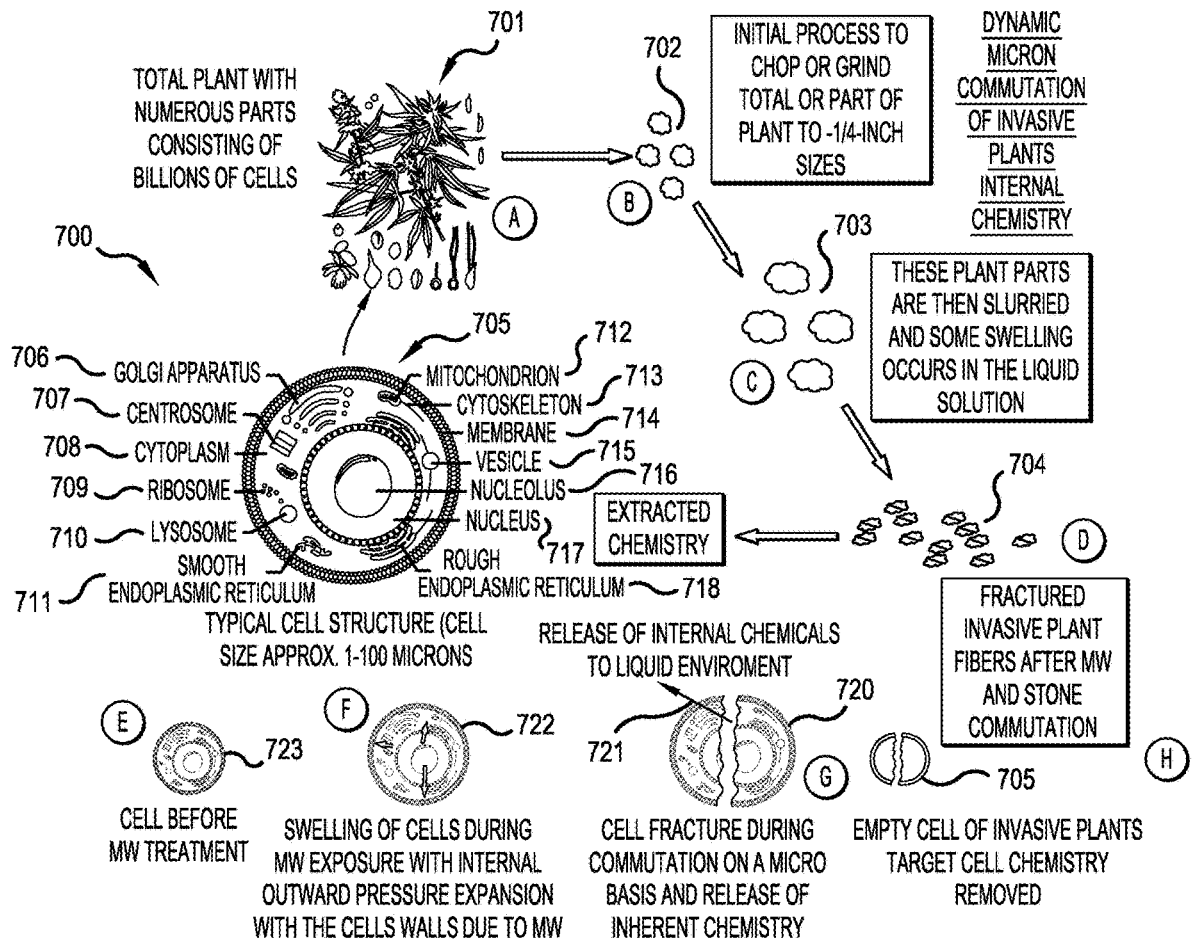
FIG. 7 is a process diagram, according to some embodiments, showing exemplary plant stock as it is processed according to some embodiments. Includes at least depiction of effects of wet-grinding and microwaving at a cellular level.

FIG. 7 illustrates a process 700 by which plant stock are processed, including processing by microwave treatment, ultraviolet light, ultrasonics, temperature, varying operating pressures and stone commutation, to extract chemicals (e.g., oxalic acid and/or derivatives thereof) internal to the cells of the plant stock. That is, what occurs is a dynamic micron commutation of invasive or native plant's internal chemistry. Various stages (A-H) in the evolution of plant stock and plant cells are illustrated as they go through reduction, cellular expansion, wall thickness reduction and porosity, mixing into slurry, and processing by microwave treatment and stone commutation.

Referencing FIG. 7, at stage A, plant stock 701 is received consisting of billions of cells.

At stage B, plant stock 701 are chopped or ground (entire of part of plant) to yield plant pieces 702 of approximately ¼ inch in size.

At stage C, plant pieces 703 are transported.

At operation D, plant stock are mixed with water (or other carrier liquids) to form suspended plant particles 704.

The internal chemistry and typical cell structure of plant cell 705 (approximately 1-100 microns in size) is shown at stage E before microwave treatment and commutation. Plant cell structures include a golgi apparatus 706, a centrosome 707, cytoplasm 708, ribosome 709, lysosome 710, smooth endoplasmic reticulum 711, mitochondrion 712, cytoskeleton 713, membrane 714, vesicle 715, nucleolus 716, nucleus 717, and rough endoplasmic reticulum 718.

At stage E, as plant cell 723 is shown before microwave treatment.

At stage F, a swelling of a cell 722 is shown as swelling occurs during microwave exposure with internal outward pressure expansion.

At stage G, a cell fracture 720 occurs commutation on a micro basis and there is release of the inherent chemistry. That is a release of the internal chemicals 721 of the cell into the liquid environment.

At stage H, an empty cell 705 of an invasive target cell with internal chemistry removed is shown. What is left is fractured invasive plant fibers are microwave treatment and stone commutation.

Figure 8:
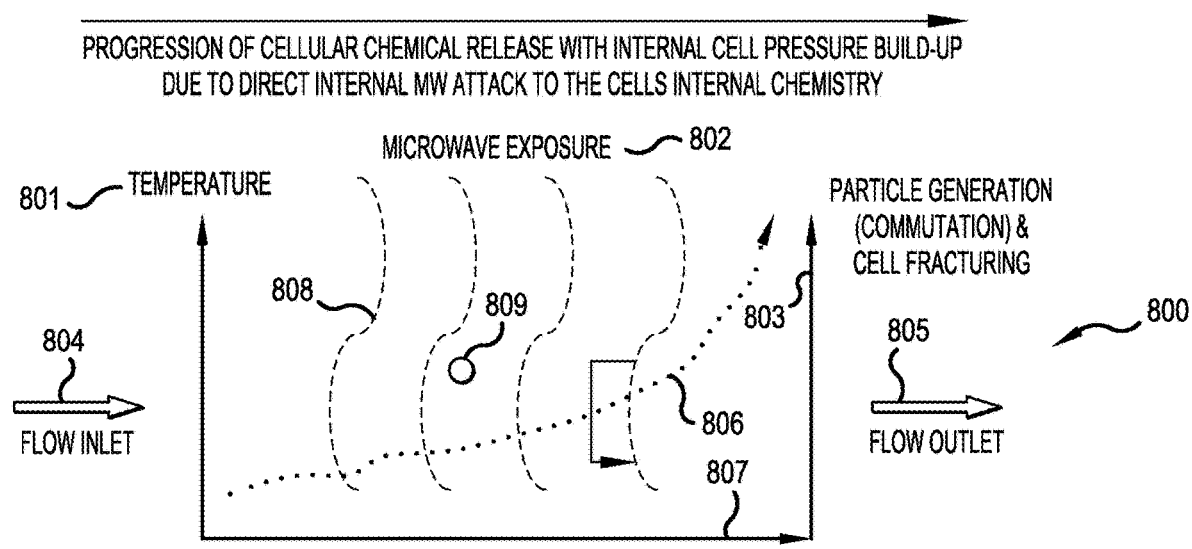
FIG. 8 is a graph, consistent with some embodiments, illustrating a progression of cellular chemical release with internal cell pressure build-up due, at least partly, to internal microwave attack to cell's internal chemistry.

Referencing FIG. 8, shown is an exemplary graph 800 illustrating a progression of cellular chemical release with internal cell pressure build-up due to direct internal microwave attack to the cell's internal chemistry.

Graph 800 includes a depiction of a flow 804 of slurry toward the microwave treatment and stone commutation operation and a flow outlet 805 after the outlet. Axis 801 (temperature) is vertical and increases upward relative to horizontal axis 807 (time). Axis 803 (extent of cell fracturing—from combination of cell swelling and stone commutation) also is vertical and increases upward relative to horizontal axis 807 (time). Also illustrated are microwave radiation waves 808 from microwave exposure 802 and plant cell 809 bombarded by the microwave radiation exposure 802.

Curve 806 illustrates the degree of chemical release of chemicals (e.g., oxalic acid) into a liquid environment. Curve 806 shows that the degree of chemical release is low near the intersection of axis 807 (time beginning), axis 801 (temperature low). Axis 803 (extent of cell fracturing) is also low. Curve 806 gradually increases showing release of internal cell chemistry and axis 807 (time), axis 801 (temperature), and axis 803 (degree of cell fracturing) all increase.

Thus, overall it is illustrated that as time increases, temperature increases from microwave exposure, and cell fracturing increases, the chemical release of a plant cell's internal chemistry nears 100%.

Figure 9:
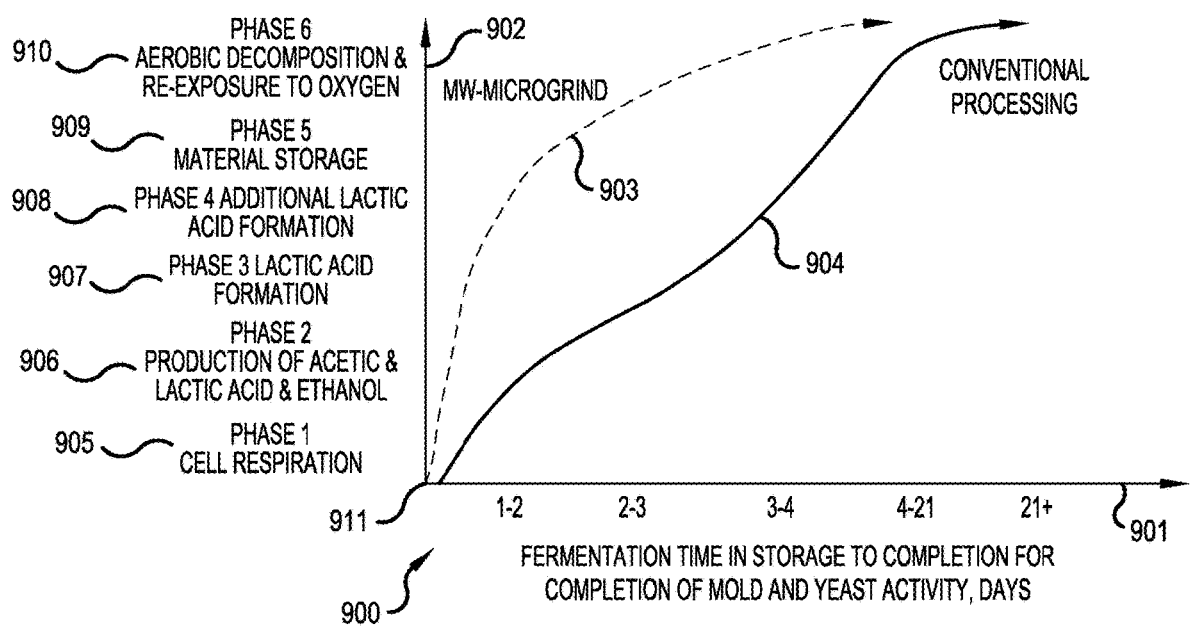
FIG. 9 is a graph, consistent with some embodiments, comparing an effect on a rate of cell aerobic decomposition dependent on whether processing is (a) with a combination of microwave treatment and micro-grinding or (b) with conventional processing.

Referencing FIG. 9, shown is a graph 900 showing that a the number of days needed for plant stocks to ferment is reduced for plant stock process with the described microwave treatment/stone commutation process versus the number of days needed for plant stocks to ferment with conventional processing. The fermentation discussed in this Graph 900 is related to silage production as discussed above relative to operation 68 of process 100.

Graph 900 includes an intersection 911 of a vertical axis 902 representing advancing phases 1 thru 6 (905-910) and of a horizontal axis 901 showing time measured in days. Curve 904 represents fermentation by conventional processing as the value in both axis 902 and 901 increase. Curve 903 represents fermentation after plant stock has been treated by microwave treatment/micro-grind (i.e., wet-grind).

Turning first to axis 902, the phases start towards the bottom of the axis with phase 1—cell respiration (item 905), then phase 2—production of acetic and lactic acid and ethanol (item 906), then phase 3—lactic acid formation (item 907), phase 4—additional lactic acid formation (item 908), phase 5—material storage (item 909), phase 6—aerobic decomposition and re-exposure to oxygen 910.

The pattern shown by graph 900 is that curve 903 (wet fiber produced by microwave/micro-grind) rises faster than curve 904 (conventional processing). Thus, wet fiber that has been produced in part by microwave processing and micro-grinding ferments quicker and more efficiently that plant fibers processed through conventional processing.

Figure 10:
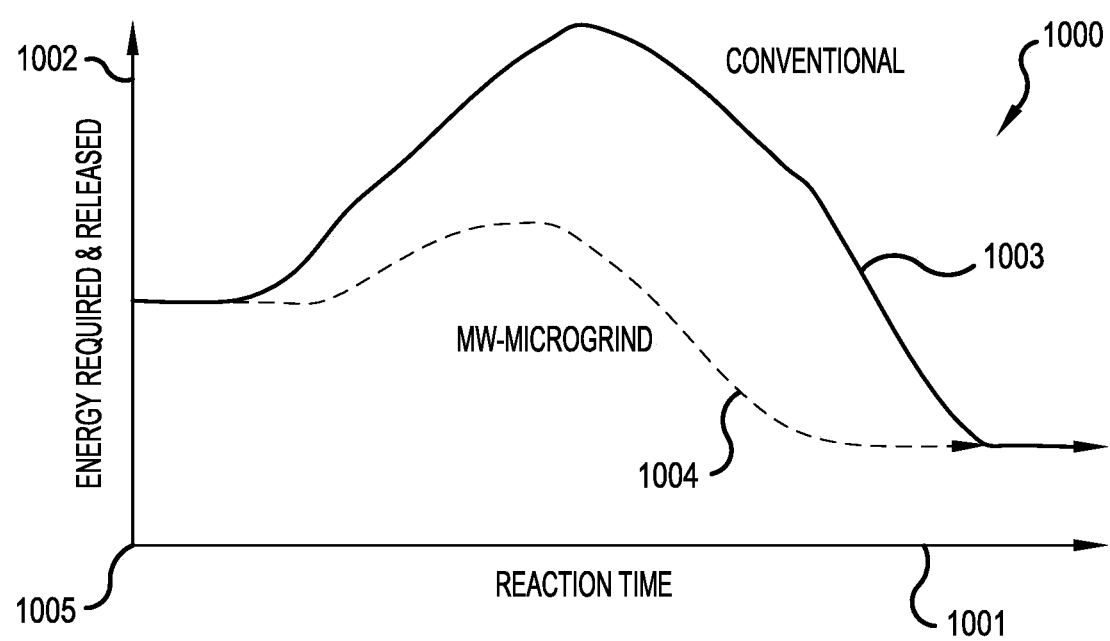
FIG. 10 is a graph, consistent with some embodiments, comparing energy usage and reaction time dependent on whether processing is (a) with a combination of microwave treatment and micro-grinding or (b) with conventional processing.

Referencing FIG. 10, a graph 1000 illustrates how much energy is required over a span of reaction time for processing with microwave/micro-grind versus conventional processing. Graph illustrates that over a span of reaction time less energy is required and released by processing with microwave/micro-grind versus conventional processing.

Graph 1000 includes intersection 1005 of vertical axis 1002 representing increasing energy required and released and horizontal axis 1001 representing increasing reaction time. Solid curve 1003 represents energy required and released over time by conventional processing. Dotted curve 1004 represents energy required and released over time by microwave/micro-grind processing.

As can be seen, curve 1003 rises higher than curve 1004 representing greater energy required and released by conventional processing versus microwave/micro-grind processing.

Figure 11:
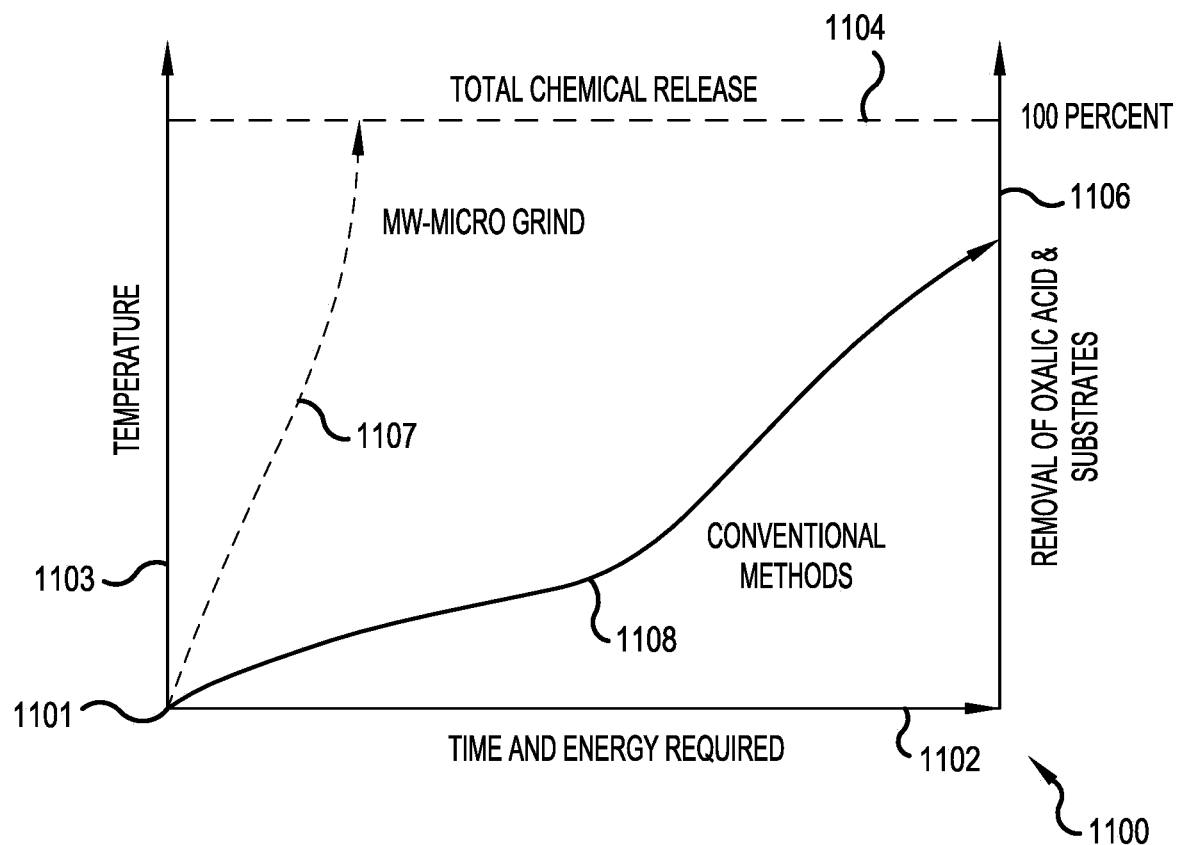
FIG. 11 is a graph, consistent with some embodiments, comparing time and energy to achieve total chemical release (of noxious chemicals) dependent on whether processing is (a) with a combination of microwave treatment and micro-grinding or (b) with conventional processing.

Referencing FIG. 11, graph 1100 illustrates how much time and energy is required to achieve 100% total chemical release of chemicals stored in plant cells for microwave/micro-grind processing versus conventional processing. Graph 1100 illustrates that much less time and energy is required to achieve 100% total chemical release of chemicals stored in plant cells for microwave/micro-grind processing as compared with conventional processing. Graph 1100 also illustrates that temperatures rise higher with microwave/micro-grind processing.

Graph 1100 illustrates intersection 1101 of vertical axis 1103 representing increasing temperature and horizontal axis 1102 representing increasing time and energy required. Horizontal axis 1102 also intersects vertical axis 1106 (parallel to axis 1103) representing increasing removal of oxalic acid and substrates. Dotted line 1104 which runs parallel to axis 1102 and perpendicular to axes 1103 and 1106 represents 100% total chemical release of chemicals (e.g., oxalic acid) from processed plant cells.

Dotted curve 1107 representing processing by microwave/micro-grind starts at intersection 1101 and rises to dotted line 1104, showing that processing by microwave/micro-grind achieves 100% chemical release. Solid curve 1108 representing conventional processing also starts at intersection 1101 and rises gradually toward, but does not reach, dotted line 1104—illustrating that it does not achieve 100% total chemical release. Moreover, solid curve 1108 consumes more of axis 1102 indicating it consumes more time and energy to achieve a lesser state of chemical release relative to microwave/micro-grind processing.

Thus, graph 1100 illustrates that much less time and energy is required to achieve 100% total chemical release of chemicals stored in plant cells for microwave/micro-grind processing as compared with conventional processing. Graph 1100 also illustrates that temperatures rise higher with microwave/micro-grind processing.

Figure 12:
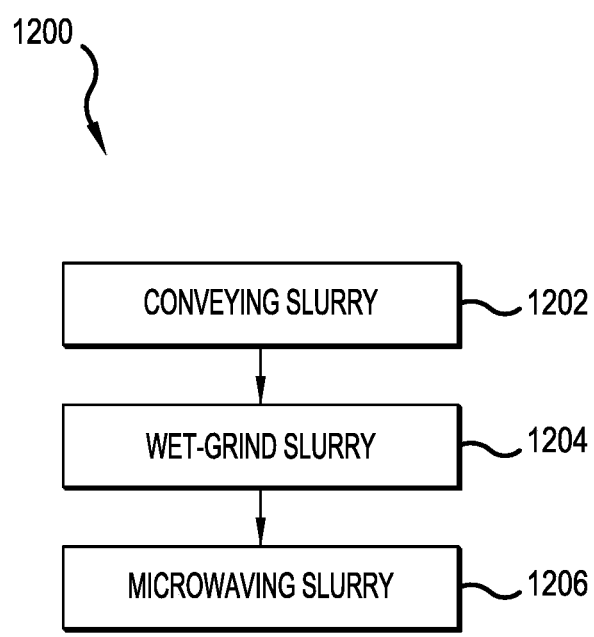
FIG. 12 is a flow diagram illustrating a method according to some embodiments.

FIG. 12 and the following figures include various examples of operational flows. Discussions and explanations may be provided with respect to the above-described principles, embodiments, and environments of FIGS. 1-11. However, the described operational flows may be executed and implemented in other environments and with different components.

In addition, although the various operational flows are presented in illustrated sequences, it should be understood that in various embodiments the various operations may be performed in different sequential orders other than those which are illustrated, or may be performed concurrently or simultaneously.

Further, in the following figures that depict various flow processes, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. For additional clarity, some optional operations may be placed in broken line boxes.

FIG. 12 illustrates a method 1200 for extracting useful products from at least one of invasive, poisonous or toxic, nuisance plant stock, may be consistent with some embodiments, include one or more of operations 1202, 1204, and 1206. Collectively, operations 1202-1206 are at least similar to operation 21 of FIG. 1C.

Referencing FIG. 12, in some embodiments operation 1202 regarding conveying the slurry includes at least conveying a slurry that contains at least one or more carrier liquids and at least some plant stock suspended in the one or more carrier liquids, the conveying being performed at least in part with a fluid conveyance of a wet-grinding apparatus. In some embodiments, operation 1202 may be implemented with at least a wet-grinding apparatus (e.g., wet-grinding apparatus (e.g., wet-grinding apparatus 121 of FIGS. 1C, 201 of FIG. 2, and/or 421 of FIG. 4) that includes at least a fluid conveyance (e.g., 205 of FIG. 2) configured for receive and direct a slurry that contains at least one or more carrier liquids and at least suspended plant stock suspended in the one or more carrier liquids.

Consistent with some embodiments, operation 1204 includes at least driving at least one rotor disk of a set of flat grinding disks of the wet-grinding apparatus with a motor drive operably coupled with a high torque motor, the driving causing the set of flat grinding disks to accept the slurry on one or more surfaces, to grind the suspended plant stock, and to discharge the slurry. In some embodiments, operation 1204 may be implemented with at least a wet-grinding apparatus (e.g., wet-grinding apparatus (e.g., wet-grinding apparatus of FIGS. 1C and 2 or 421 of FIG. 4) that includes at least a set of flat grinding disks (e.g., 217 of FIG. 2, 417 of FIG. 4) that include at least one rotor disk (e.g., 210, 410) that is operably coupled to be driven by the motor drive (e.g., motor drive 204 driven by high torque motor 221), the set configured, when the at least one rotor disk is driven by the motor drive, to accept the slurry from the fluid conveyance 205, to grind the suspended plant stock, and to discharge the slurry.

Consistent with some embodiments, operation 1206 includes at least emitting microwave radiation, with at least one microwave emitter, toward at least a portion of the slurry at least one of before, while, or after the suspended plant stock is ground by the wet-grinding apparatus. In some embodiments, operation 1204 may be implemented with at least a microwave unit (e.g., 220 of FIG. 2, and/or microwave units 120, 122) that includes at least one microwave emitter (e.g., 211, 311) configured to emit microwave radiation toward at least a portion of the slurry at least one of before, while, or after the slurry is ground by the wet-grinding apparatus (e.g., 121, 201, and/or 401).

Figure 13:
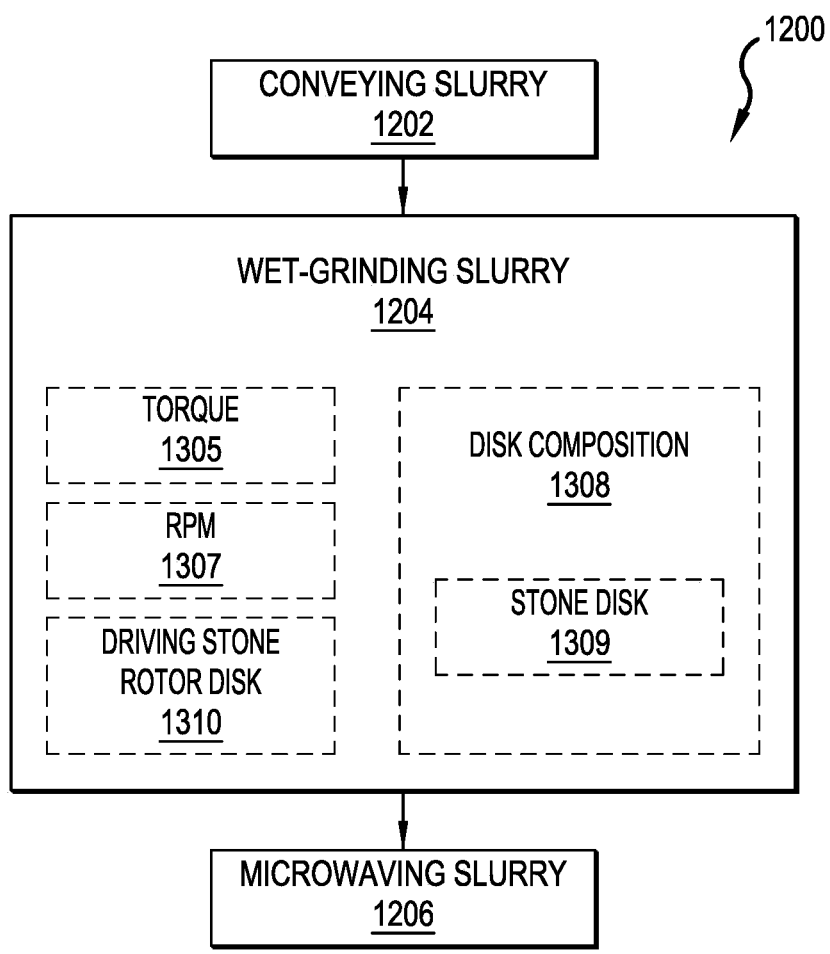
FIG. 13 is a flow diagram illustrating the method of FIG. 12, with additional optional embodiments.

Referencing FIG. 13, in some embodiments, operation 1204 regarding wet-grinding the slurry optionally includes one or more of operations 1305, 1307, 1308, or 1310.

Consistent with some embodiments, operation 1305 includes at least driving at least one rotor disk of a set of flat grinding stones with a motor drive operably coupled with a high torque motor at a torque in a range between 10.5 foot-pounds and 11,000 foot-pounds. In some embodiments operation 1305 is implemented at least with a high torque motor (e.g., 221) that is configured to provide torque in a range between 10.5 foot-pounds and 11,000 foot-pounds.

Consistent with some embodiments, operation 1307 includes at least driving at least one rotor disk of a set of flat grinding stones with a motor drive operably coupled with a high torque motor operating at between a range of approximately 60 rpm and 3,600 rpm. In some embodiments, operation 1307 is implemented at least with a high torque motor (e.g., 221) that is configured to operate at one or more speeds between 60 rpm and 1,800 rpm.

Consistent with some embodiments, operation 1308 includes at least driving at least one rotor disk of a set of flat grinding disks that includes at least one of a stone disk, a steel alloy disc, or a disk composed in part of stone and in part of steel alloy. In some embodiments, operation 1308 is implemented at least in part with set of flat grinding disks (e.g., 217, 417) that includes at least one of a stone disk, a steel alloy disc, or a disk composed in part of stone and in part of steel alloy.

In some embodiments, operation 1308 optionally includes operation 1309.

Consistent with some embodiments, operation 1309 includes at least driving at least one rotor disk of a set of flat grinding disks that includes at least one flat grinding stone composed at least partly of at least one of silicon carbide, aluminum oxide, zirconia, ceramic friable mixes or selected metal disks. In some embodiments, operation 1309 is implemented at least with set of flat grinding disks (e.g. disks 210, 209 of set 217) includes at least one flat grinding disk composed at least partly of at least one of silicon carbide, aluminum oxide, zirconia, or ceramic friable mixes, including metal alloy types.

Consistent with some embodiments, operation 1310 includes at least driving at least one rotor stone of a set of flat grinding stones, the flat grinding stones including at least two stator stones and the at least one rotor stone, the individual flat grinding stones being aligned along respective axial holes about the motor drive, the driving including at least driving the at least one rotating stone with the high torque motor, the driving causing the slurry (1) to be received via the respective axially aligned holes from the fluid conveyance, (2) to be directed onto flat grinding surfaces of the individual flat grindings stones, (3) to be ground while the suspended plant stock is in solution in the slurry, and (4) to be discharged from outer perimeters defined by the individual flat grindings stones of the set of flat grinding stones. In some embodiments operation 1310 is implemented with at least a set of flat grinding stones (e.g., 217, 417), the set of flat grinding stones including at least two stator stones (e.g., 409A, 409B) and at least one rotor stone (e.g., 210, 410), the individual flat grinding stones being aligned along respective axial holes (e.g., 225) about the motor drive (e.g., 204, 404), the at least one rotor stone being configured to be driven by the high torque motor via the motor drive, and wherein when the at least one rotor stone is driven by the high torque motor the set of flat grinding stones is configured to receive the slurry via the respective axially aligned holes from the fluid conveyance, to direct slurry onto flat grinding surfaces (e.g., 226 of FIG. 2) of the individual flat grindings stones of the set, to grind the suspended plant stock while it is in solution in the slurry, and to discharge the slurry from outer perimeters (e.g., 227 of FIG. 2) defined by the individual flat grinding stones of the set of flat grinding stones.

Figure 14:
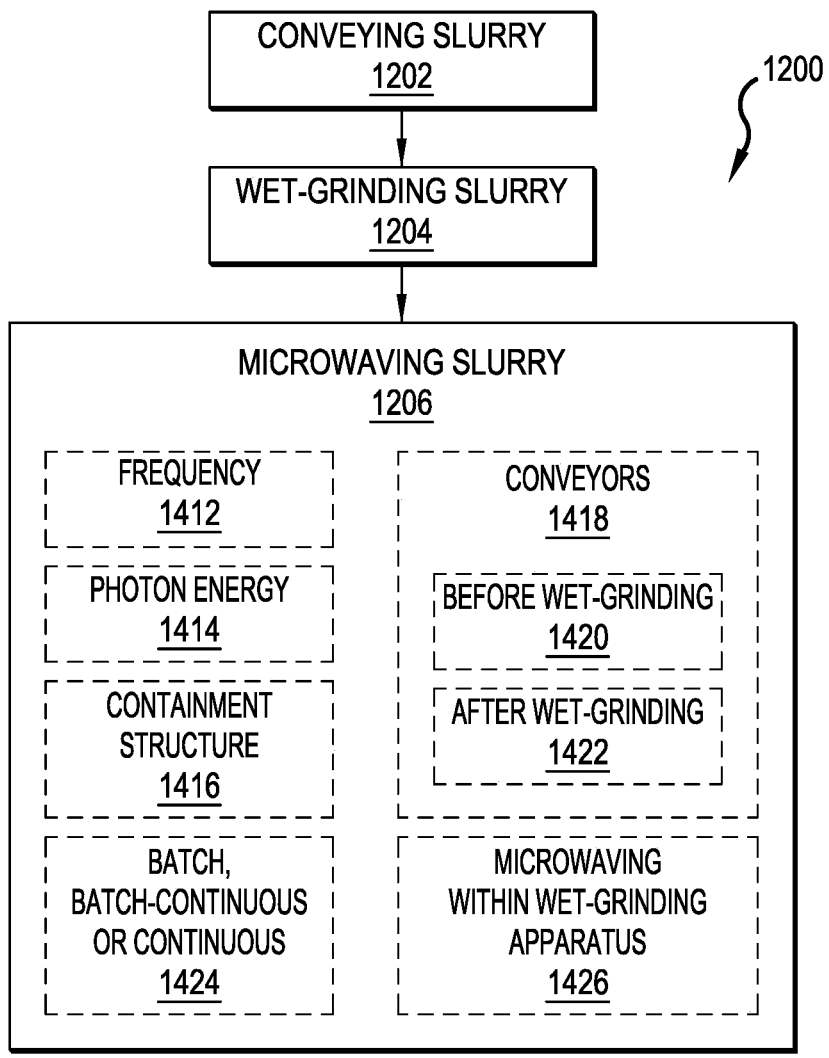
FIG. 14 is a flow diagram illustrating the method of FIG. 12, with additional optional embodiments.

Referencing FIG. 14, in some embodiments operation 1206 regarding microwaving the slurry optionally includes one or more of operations 1412, 1414, 1416, 1418, 1424 or 1426.

Consistent with some embodiments, operation 1412 regarding microwaving the slurry includes at least emitting, with the at least one microwave emitter, at least some microwave radiation in a range between 300 GHz and 300 MHz. In some embodiments operation 1412 is implemented with at least at least one microwave emitter (e.g., 211, 411) is configured to emit at least some microwave radiation in a range between 300 GHz and 300 MHz.

Consistent with some embodiments, operation 1414 regarding microwaving the slurry includes at least emitting, with the at least one microwave emitter, at least some microwave radiation with a photon energy between 1.24 µeV. to 12.2. feV micro electron volts. In some embodiments operation 1414 is implemented with at least at least one microwave emitter (e.g., 211, 411) is configured to emit at least some microwave radiation with a photon energy between 1.24 µeV to 12.2 micro electron volts and electromagnetic spectrum frequency from 300 Hz to 3000 GHz.

Consistent with some embodiments operation, 1416 includes at least emitting the microwave radiation within a containment structure configured to contain the microwave radiation and gases off-gassed from the slurry during microwave radiation treatment, creating a negative atmosphere between 760 and 10-9 torr within the containment structure with a compressor, and converting the off-gassed gases to liquid form for capture with at least a vapor recovery unit that includes at least one condenser. In some embodiments operation 1416 is implemented at least with a microwave unit that includes at least a containment structure (e.g., 202 of FIG. 2 and/or 313 of FIG. 3) configured to contain the microwave radiation and gases off-gassed from the slurry during microwave radiation treatment and a compressor (e.g., 223 of FIG. 2 and/or 323 of FIG. 3) configured for creating a negative atmosphere between 760 and 10-9 torr in the containment structure. And operation 1415 being further implemented with a vapor recovery unit (e.g., 125) that includes at least one compressor for converting the off-gassed gases to liquid form for capture.

Consistent with some embodiments, operation 1418 includes at least conveying the slurry through one or more high temperature-resistant conveyances that include at least one of tubes, coils, or troughs that are transparent to microwave radiation, and emitting, with the at least one microwave emitter, microwave radiation toward at least a portion of the one or more conveyances, wherein the emitting of microwave radiation causes cells of the ground plant stocks in the slurry within the one or more conveyances to expand thereby making a wet-grinding more effective. In some embodiments operation 1418 is implemented at least with a microwave unit (e.g., microwave unit 120 of FIG. 3) is separate from the wet-grinding apparatus and that includes at least one or more high temperature-resistant conveyances (e.g., 314) that include at least one of tubes, coils, or troughs that are transparent to microwave radiation and that are further configured for receiving and conveying the slurry and wherein the microwave emitter is positioned to emit microwave radiation (e.g., with microwave emitter 311 and Horn 312) toward at least a portion of the one or more conveyances, and wherein when the microwave emitter is in operation the emitted microwave radiation cause cells of the ground plant stocks within the one or more conveyances to expand thereby making a wet-grinding more effective. Additionally ultrasound may vary and operate from 2 to 18 megahertz range or 30 to 500 KHz.

In some embodiments, operation 1418 optionally includes one or more of operation 1420 or 1422.

Consistent with some embodiments, operation 1420 includes at least emitting the microwave radiation toward at least the portion of the one or more conveyances before processing of the slurry in the wet-grinding apparatus and after the emitting of the microwave radiation, conveying the slurry, to an intake of the wet-grinding apparatus. In some embodiments operation 1420 is implemented with at least one or more one or more conveyances (314) that are configured to receive the slurry for exposure to the microwave radiation (e.g., from microwave emitter 311) before processing in the wet-grinding apparatus (e.g., 201 or 401) and are further configured to convey the slurry, after exposure to microwave radiation to the fluid conveyance (e.g., 205, 405) of the wet-grinding apparatus.

Consistent with some embodiments, operation 1422 includes at least receiving the slurry in the one or more conveyances for exposure to microwave radiation after grinding in the wet-grinding apparatus and emitting the microwave radiation toward at least the portion of the one or more conveyances. In some embodiments operation 1422 is implemented with at least one or more conveyances (314) are configured to receive the slurry for exposure to the microwave radiation after grinding in the wet-grinding apparatus (e.g., 201 or 401).

Consistent with some embodiments, operation 1424 includes at least emitting microwave radiation, with at least one microwave emitter of a microwave unit that is operating in at least one of a batch, batch-continuous or a continuous operation mode. In some embodiments operation 1424 is implemented at least with a microwave unit (e.g., 120 or 220) that is configured to operate in at least one of a batch, batch-continuous or a continuous operation mode.

Consistent with some embodiments, operation 1426 includes at least emitting the microwave radiation toward the slurry while the slurry is at least partially within the wet-grinding apparatus, the wet-grinding apparatus being encased in an encasement configured for containing the microwave radiation and wherein the emitting of the microwave radiation toward the slurry causes cell fibers within the slurry to expand and thereby increase an effectiveness of grinding. In some embodiments operation 1426 is implemented with at least microwave unit (e.g., unit 220 of FIG. 2) is at least partially integrated as a portion of the wet-grinding apparatus (e.g., 201), the microwave unit including at least a the microwave emitter (211) configured to emit microwave radiation toward the slurry and an encasement (202) configured to encase the wet-grinding apparatus during microwave emissions and wherein the microwave radiation causes cell fibers within the slurry to expand and thereby increasing effectiveness of grinding.

Figure 15:
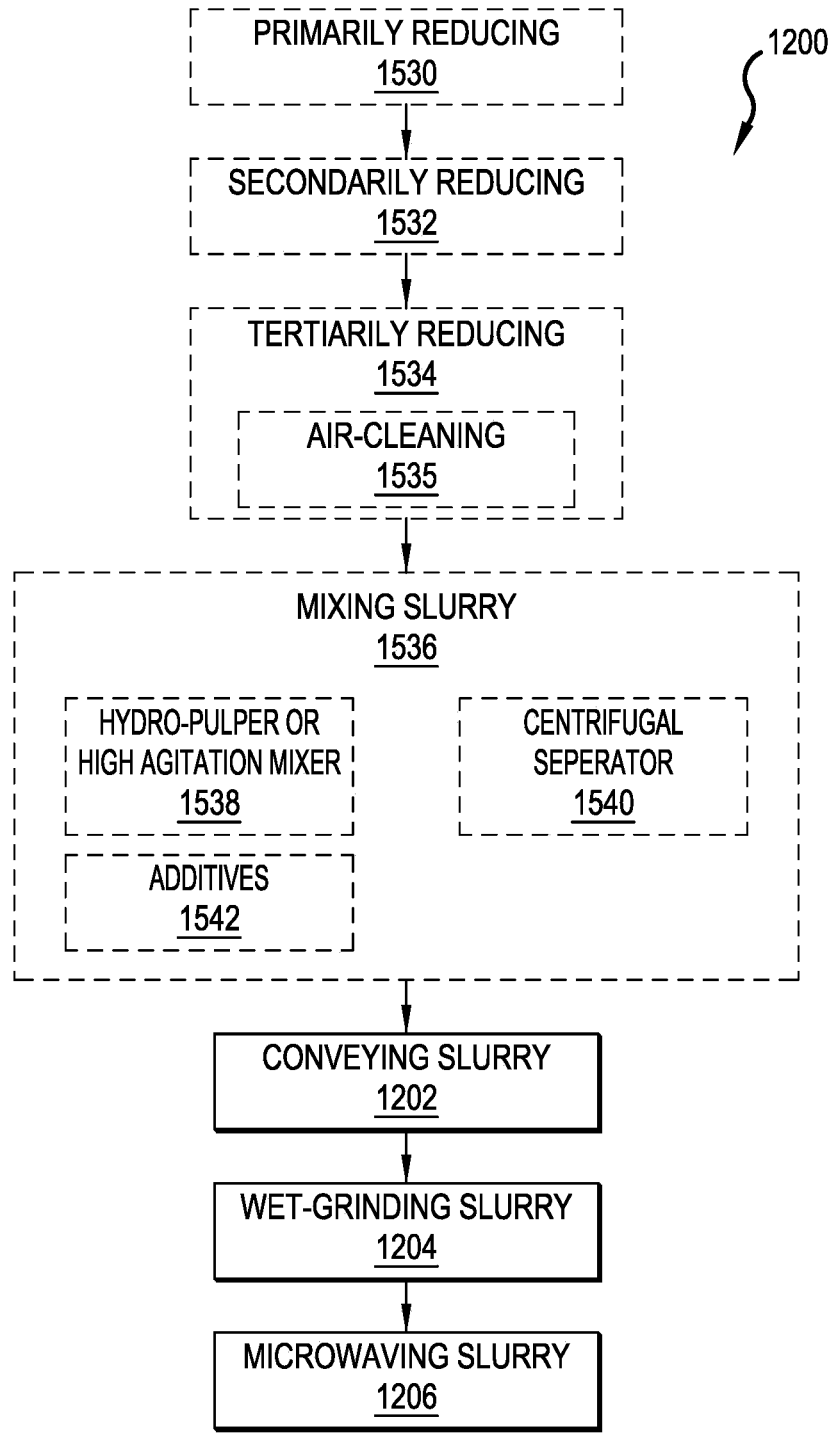
FIG. 15 is a flow diagram illustrating the method of FIG. 12, with additional optional embodiments.

Referencing FIGS. 15A and 15B, in some embodiments method 1200 optionally further includes one or more of additional operations 1530, 1532, 1534, or 1536.

Consistent with some embodiments, operation 1530 includes at least primarily reducing a volume of plant stock by at least one of shredding or chopping the plant stock into pieces of less than ¼ to 6 inches approximately in length.

Consistent with some embodiments, operation 1532 includes at least secondarily reducing a volume of plant stock that has previously undergone primary reduction by at least one of shredding or compacting the plant stock with at least one of a rotary shear, a compactor, knife-mill, granulator or a hammer mill or similar size reduction devices. In some embodiments operation 1532 is implemented at least with secondary reducing equipment (e.g., 107 of FIG. 1A), including at least one of a rotary shear a compactor, or a hammer mill, configured to at least one of shred or compact plant stock that has previously undergone primary reduction, thereby reducing its volume to produce compacted plant stock for transport.

Consistent with some embodiments, operation 1534 includes at least tertiarily reducing plant stock with at least one of a granulator, a grinder, or a knife mill to further reduce secondarily reduced plant stock to reduce the plant stock to a particle size adapted for wet-grinding with wet-grinding apparatus. In some embodiments operation 1534 is implemented at least with tertiary reducing equipment (e.g., 111 of FIG. 1A), including at least one of a granulator, a grinder, or a knife mill, configured for further reducing secondarily reduced plant stock to render plant stock to a particle size adapted for wet-grinding with wet-grinding apparatus.

In some embodiments, operation 1534 optionally includes operation 1535.

Consistent with some embodiments, operation 1535 includes at least capturing air-suspended particles escaping from tertiary reduction of plant stock with at least one of a cyclone or a baghouse. In some embodiments operation 1535 is implemented with at least air-cleaning system (e.g., 112 of FIG. 1A) configured to capture air-suspended particles escaping from tertiary reduction of plant stock, the air-cleaning system including at least one of a cyclone or a baghouse.

Consistent with some embodiments, operation 1536 includes at least receiving the one or more carrier liquids and reduced plant stock in one or more containers and mixing said one or more carrier liquids and reduced plant stock in said one or more containers to form a slurry of which the suspended plant stock is between 1% and 25% by weight. In some embodiments operation 1536 may be implemented with at least a mixing apparatus (115 of FIG. 1B—e.g., hydra-pulper or high agitation mixer) configured for receiving the one or more carrier liquids and reduced plant stock in one or more containers and is further configured for mixing said one or more carrier liquids and the reduced plant stock in said one or more containers to form a slurry of which suspended plant stock is between 1% and 25% by weight.

In some embodiments, operation 1536 optionally includes one or more of operations 1538, 1540, or 1542.

Consistent with some embodiments, operation 1538 includes at least mixing said one or more carrier liquids and reduced plant stock with at least one of a hydro-pulper or a high-agitation mixer. In some embodiments operation 1538 may be implemented with at least a mixing apparatus (e.g. 115) that includes at least one or a hydro-pulper or a high-agitation mixer for performing at least a portion of the mixing.

Consistent with some embodiments, operation 1540 includes at least at least partially separating, with a centrifugal separator, at least one of earthly inerts or non-plant materials from the slurry. In some embodiments operation 1540 may be implemented with at least a mixing apparatus (e.g., 115) that further includes at least a centrifugal separator configured for at least partially separating at least one of earthly inerts or non-plant materials from the slurry.

Consistent with some embodiments, operation 1542 includes at least mixing into at least one of the one or more carrier liquids or the slurry at least one of a surfactant, an additive, vegetation containing sugars, or an amylase type additive. In some embodiments operation 1542 may be implemented with at least a mixing apparatus (115) is further configured to receive and to mix into at least one of the one or more carrier liquids or the slurry at least one of a surfactant, an additive, vegetation containing sugars, or an amylase type additive. The employ of certain additives via chemical mixing or compounding may be helpful in making the extracted materials ideal for certain applications for attracting mites, beetles, snail type infestations. Including adding selected nature oils to the extracted chemical such as oxalic acid at controlled dosages as not to be harmful to the targeted specie such as bees, fish, bird's other of nature's creatures to be protected.

Figure 16:
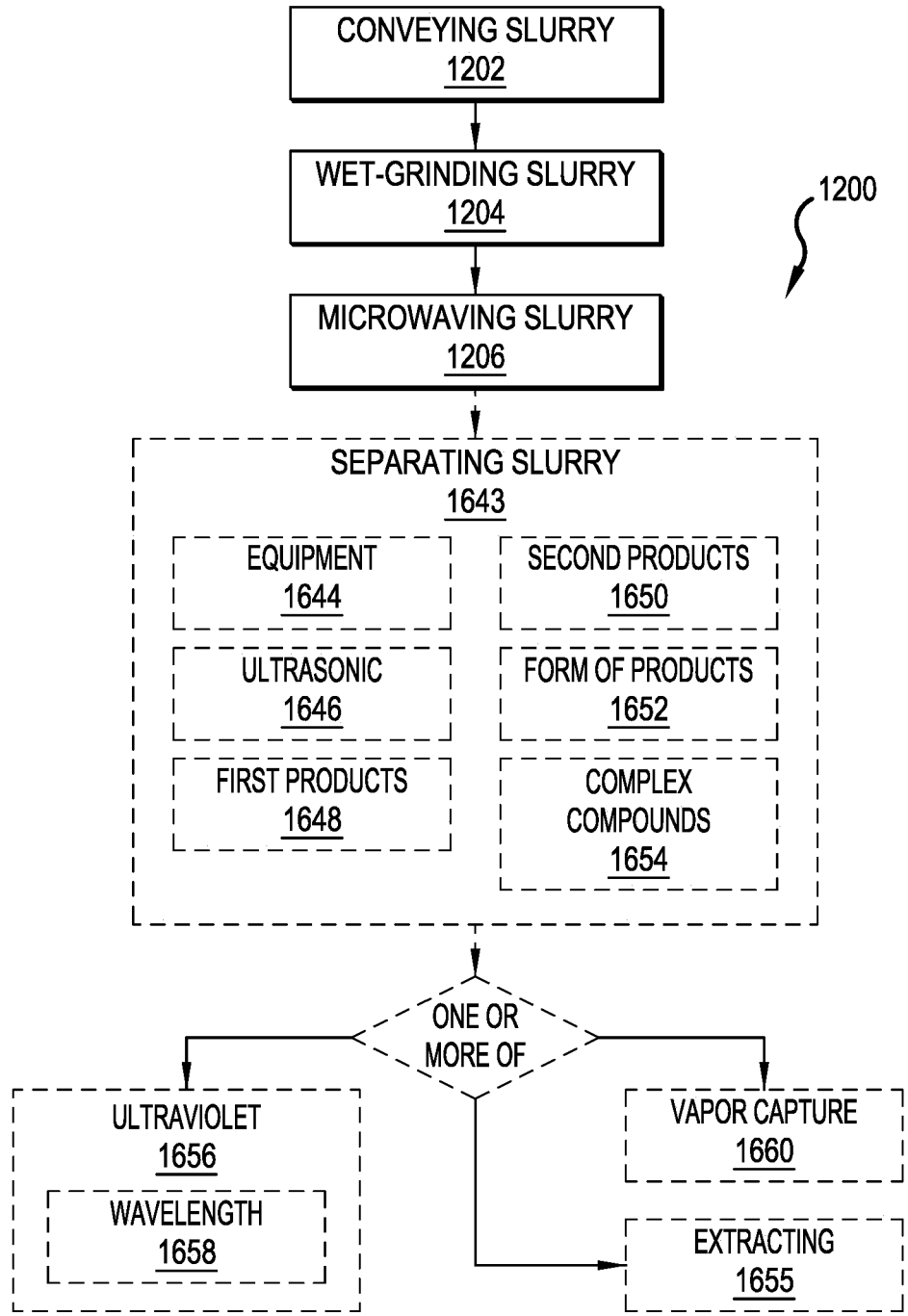
FIG. 16 is a flow diagram illustrating the method of FIG. 12, with additional optional embodiments.

Referencing FIG. 16, in some embodiments method 1200 optionally further includes one or more of additional operations 1643, 1655, 1656, or 1660.

Consistent with some embodiments, operation 1643 includes at least separating the slurry into (1) a wet fiber suitable for further processing into one or more first products and (2) a liquid fraction suitable for further processing into one or more second products. In some embodiments operation 1643 may be implemented with at least a separator apparatus (130 of FIG. 1D—e.g., one or more of a decanter, a basket centrifuge, or an SS Buchner type funnel system) configured to separate the slurry into a wet fiber suitable for further processing into one or more first products and a liquid fraction suitable for further processing into one or more second products.

In some embodiments, operation 1643 optionally includes one or more of operations 1644, 1646, 1648, 1650, 1652, or 1654.

Consistent with some embodiments, operation 1644 includes at least separating the slurry at least in part with a separator apparatus that includes at least one of a decanting centrifuge, a basket centrifuge, or an SS Buchner Funnel method, flotation techniques with ultrasonics. In some embodiments operation 1644 may be implemented with at least a separator apparatus (e.g., 130) includes at least one of a decanting centrifuge, a basket centrifuge, flotation system or an SS Buchner Funnel system.

Consistent with some embodiments, operation 1646 includes at least directing ultrasonic waves having a frequency between 20 Hz and 200 Mhz toward the slurry, wherein the ultrasonic waves aid separation of the slurry into the liquid fraction and the wet fiber. In some embodiments operation 1646 may be implemented with at least an ultrasonic emitter (e.g., where separator apparatus 130 includes an ultrasonic emitter) configured to direct ultrasonic waves having a frequency between 20 Hz and 200 Mhz toward the slurry, wherein the ultrasonic waves aid separation of the slurry in the liquid fraction and the wet fiber.

Consistent with some embodiments, operation 1648 includes at least separating the slurry into a wet fiber suitable for further processing into one or more first products that include at least one of gluten-free flour, pellets for agricultural feed, fillers for foodstuffs, plastics, adhesives, ethanol, or distilled spirits. In some embodiments operation 1648 may be implemented with at least a separator apparatus (e.g., 130) configured to separate the slurry into a wet fiber suitable for further processing into one or more first products that include at least one of gluten-free flour (e.g., 160), pellets for agricultural feed (e.g., 161), fillers for foodstuffs, plastics, adhesives, ethanol (e.g., 146), or distilled spirits (e.g., 147).

Consistent with some embodiments, operation 1650 includes at least separating the slurry into a liquid fraction suitable for further processing into one or more second products that include at least one of a pesticide, an insecticide or a fungicide. In some embodiments operation 1650 may be implemented with at least a separator apparatus (e.g. 130) configured to separate the slurry into a liquid fraction suitable for further processing into one or more second products that include at least one of a pesticide, an insecticide or a fungicide (e.g., liquids 141 of FIG. 1F).

Consistent with some embodiments, operation 1652 includes at least separating the slurry into a wet fiber suitable for further processing into at least one of liquid, solid, crystal, fibrous, powdery, granular, or oily products. In some embodiments operation 1652 may be implemented with at least a separator apparatus (e.g. 130) configured to separate the slurry into a liquid fraction and a wet fiber that are suitable for further processing into one or more products that include at least one of liquid (e.g., 141, 146, 147), solid (141), crystal (141), powdery (161), granular, or oily (141) products.

Consistent with some embodiments, operation 1654 includes at least separating the slurry into a wet fiber suitable for further processing into one or more materials that can be blended with at least one of an organic material, a dry material, a wet material, or a liquid to produce one or more complex compounds. In some embodiments operation 1654 may be implemented with at least a separator apparatus (e.g. 130) configured to separate the slurry into a liquid fraction and a wet fiber that are suitable for further processing into one or more products that can be blended with at least one of an organic material, a dry material, a wet material, or a liquid to produce one or more complex compounds.

As discussed above relative to FIG. 16, in some embodiments method 1200 may optionally include one or more of additional operations 1655, 1656, or 1660.

In some embodiments, operation 1655 includes at least extracting at least one of an oxalic acid fraction, an oxalic salt fraction, or complementary associated organic compounds from the liquid fraction with at least one of ultrasonic settling, centrifuging, or liquid-liquid separation. In some embodiments operation 1655 may be implemented with at least an extractor (e.g., 137, and/or extractor 650) that is configured to accept the liquid fraction separated by the separator apparatus and extract at least one of an oxalic acid fraction, an oxalic salt fraction, or organic compounds from the liquid fraction with at least one of ultrasonic setting, centrifuging, or liquid-liquid separation. In the case of sagebrush, the extracted oily fraction includes value added substances such as camphor, pines, cineoles, methacrolein's and a-terpinene, d-camphor and sesquiterpenoids that have valuable applications when refined for a wide variety of medical, industrial, commercial, and cosmetic use to name a few.

In some embodiments, operation 1656 includes at least directing germicidal ultraviolet light radiation toward at least one of the slurry, the liquid fraction or the wet fiber, wherein the ultraviolet light is configured to reduce a risk of at least one of bacterial or fungal growth. In some embodiments operation 1656 is implemented with at least an ultraviolet light chamber (e.g., 131 and/or 154 of FIG. 1D) configured with an ultraviolet emitter (not shown) for directing germicidal ultraviolet light radiation toward at least one of the slurry, the liquid fraction or the wet fiber, wherein the ultraviolet light is configured to reduce a risk of at least one of bacterial or fungal growth.

Further referencing FIG. 16, in some embodiments operation 1656 optionally includes operation 1658).

Consistent with some embodiments, operation 1658 includes at least directing at least some ultraviolet waves of the ultraviolet light waves that have one or more wave lengths in a range between 100 and 2809 nanometers. In some embodiments operation 1658 is implemented with at least an ultraviolet light chamber (e.g., 131 and/or 154 of FIG. 1D) configured with an ultraviolet emitter (not shown) for directing at least some ultraviolet waves of the ultraviolet light waves that have one or more wave lengths in a range between 100 and 2809 nanometers.

Consistent with some embodiments, operation 1660 includes at least creating a negative atmosphere in one or more chambers containing at least some of the slurry to facilitate capture of at least some light volatiles escaping from at least one of the slurry or the extracted liquid fraction and converting at least some of the captured light volatiles into one or more liquid forms. In some embodiments operation 1660 may be implemented with at least a vapor recovery unit (e.g., 125 of FIG. 1C) that includes at least one or more conveyances for conveying off-gassed vapors escaping from at least one of the slurry or the liquid fraction and a compressor configured to receive the off-gassed vapors from the one or more conveyances and to convert the off-gassed vapors into one or more liquid forms.

It is noted that in some embodiments of at least one of an invasive, a poisonous or a toxic plant stock includes at least one of tumbleweed (*Salsula targus*), kudzu, rosemary bean (*Abrus precatorius*) or the various varieties of sage brushs (eg. *Artemisia tridentata*) plant stock.

Figure 17:
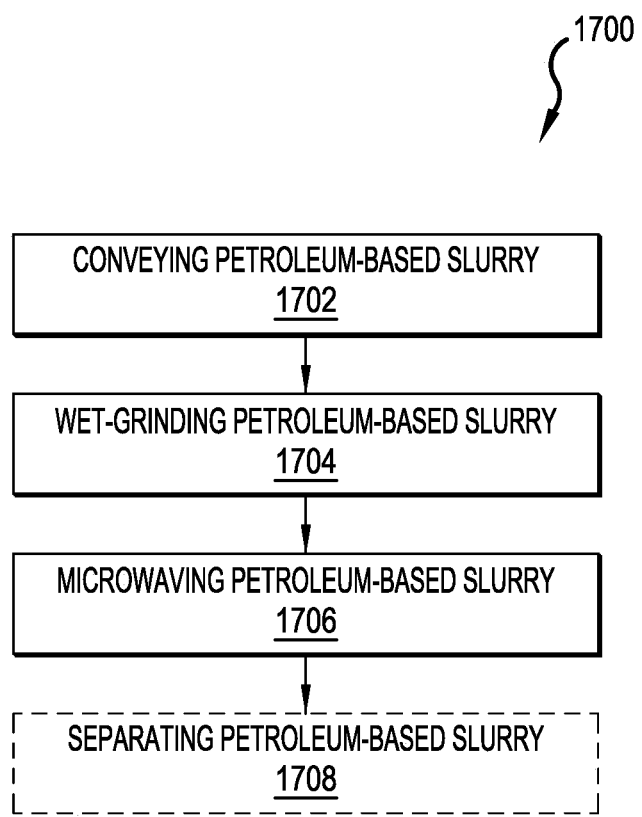
FIG. 17 is a flow diagram illustrating a method according to some embodiments.

FIG. 17 is a flow chart illustrating an exemplary method 1700 for extracting useful products from petroleum reservoir materials. Consistent with some embodiments method 1700 includes operations 1702, 1704, 1706 and optionally operation 1708. It is noted that these operations may be implement with at least some of the equipment discussed above relative to method 1200.

Consistent with some embodiments operation 1702 includes at least conveying a slurry that contains at least one or more carrier liquids and at least some petroleum-reservoir materials suspended in the one or more carrier liquids, the conveying being performed at least in part with a fluid conveyance of a wet-grinding apparatus. In some embodiments operation 1702 may be implemented with at least a wet-grinding apparatus (e.g., 201 of FIG. 2 and/or 401 of FIG. 4) that includes at least a fluid conveyance (e.g., 205 of FIG. 2) configured for receive and direct a slurry that contains at least one or more carrier liquids and at least some petroleum-reservoir materials suspended in the one or more carrier liquids.

Consistent with some embodiments, operation 1704 includes at least driving at least one rotor disk of a set of flat grinding disks of the wet-grinding apparatus with a motor drive coupled with a high torque motor, the driving causing the set of flat grinding disks to accept the slurry onto one or more grinding surfaces of individual grinding disks of the set of flat grinding disks, to grind the suspended petroleum-based reservoir materials, and to discharge the slurry. In some embodiments operation 1704 may be implemented with at least a wet-grinding apparatus (e.g., 201 of FIG. 2 and/or 401 of FIG. 4) that includes at least a high torque motor, a motor drive operably coupled to be driven by the high torque motor, and a set (e.g., 217 of FIG. 2 and/or 417 of FIG. 4) of flat grinding disks that include at least one rotor disk (e.g., 210 and/or 410) that is operably coupled to be driven by the motor drive (e.g., motor drive 204 driven by high torque motor 221), the set configured, when the at least one rotor disk is driven by the motor drive, to accept the slurry from the fluid conveyance, to grind the suspended petroleum-reservoir materials, and to discharge the slurry.

Consistent with some embodiments, operation 1706 includes at least emitting microwave radiation, with at least one microwave emitter, toward at least a portion of the slurry at least one of before, while, or after the suspended petroleum-reservoir materials are ground by the wet-grinding apparatus. In some embodiments operation 1706 may be implemented with at least a microwave unit (e.g., 220 of FIG. 2, and/or microwave units 120, 122) that includes at least one microwave emitter (e.g., 211, 311) configured to emit microwave radiation toward at least a portion of the slurry at least one of before, while, or after the slurry is ground by the wet-grinding apparatus (e.g., 121, 201, and/or 401).

Optionally, method 1700 includes operation 1708, includes at least separating the slurry into (1) a solid residue and (2) a petroleum liquid fraction suitable for further processing into one or more petroleum-based products. This operation is performed with separator apparatus 130 (e.g. one or more of a decanter, a basket centrifuge, flotation, or an SS Buchner funnel system).

In addition to the above disclosure, the following discussion is provided:

The additives for pharmaceuticals and supplements either whole or partial.

Derivatives from invasive plants discussed in this document could be excellent surfactants or cleaners for many various types of metals and nonmetals. Potential uses include electronics, chemical plants, normal household usage, pharmaceuticals, cosmetics, cleaners and commercial and industrial applications.

These derivatives could also be used for biological control services or for an aerosol, or liquid for controlling various vectors such as bacteria and microbes. The derivatives may be very effective in controlling or eliminating germs such as corona type viruses. Many other unexplored and new biological germs may not yet be discovered.

Kudzu is an invasive plant brought here by the Corps of Engineers to help erosion control. It has gotten wildly out of control but can be an excellent source of food. It has inherent derivatives for use in many products. Therefore, harvesting this plant under controlled conditions provides an economical food source. It could also be useful as application as a filler in commercial, agricultural, pharmacal and industrial products. If processed properly with this technology it could be a standalone product or blended with the final fiber products from the forementioned process during commutation or at the mixing, pelletizing, extrusion phases.

Reference is made to Toxic Plants of North America, Second Edition by George E Burrous and Ronald J. Tyrl, which describes many plants that present opportunities in the medical and chemical fields, along with their derivatives.

Plants such as the very poisonous variety, may be excellent for controlling certain diseases in a natural manner and not synthetically derived. These plants could be used as a supplement or as an additive to existing chemicals to achieve a higher in purpose of effectiveness. Additionally, these invasive plants may have a great value, being naturally occurring, with shorter half-lives and therefore not remaining in the environment. When cheat grass (*Bromus tectorum*) is process with the wet microgrid system, the thorny stems of this grass are reduced to being soft and not interfering with the digestive system of the consuming animal. Also, the selective removal of the high concentrate of silica may have a positive effect on improved digestion if the consuming animal including. Including tumbleweed, with the potential to reduce digestive enteric emissions (greenhouse gases from livestock).

It may be desirable to separate the various parts of the plants such as the leaves, the stems or the flowers for higher benefits for various applications. Example is the Roseberry bean (*Arbus precatorius*) is known to kill some plants that may be undesirable or noxious. It may be an excellent replacement for commercial week-killers that are derived from synthetically-derived chemicals.

It is noted that in some embodiments the MW-micro grind systems herein described can be a plurality of machines operating in series or in parallel depending or both on the circumstances of the materials being processed. Additionally, the feedstock or slurry being may be recycled back through a process at certain points to for production of certain products. Combinations of various types of plants may be processed at the same time.

The plants described in this document generally have extensive chemical complexes that are not easily synthesized in the lab. Therefore, the systems and processes described in this document provide plant-derived products with superior properties as compared with synthetically derived chemicals, providing potential for applications in the medical industrial and commercial fields.

Plants such as those described in this document can have significant derivatives and substrates for products such as plastics, textiles, binders for construction, glues or adhesives etc.

Unlike the other technologies, the microwave and micro-grind technologies described herein preserve plants composite composition. They allow for removal of portions such as the fibers that can be effective and useful for use as a food application or other applications.

Processes described herein allow for reprocessing the end products to produce more affective products. For example, fiber remaining from the extracted plant could be re-processed to another form or treated in a different manner.

Upon receiving plants at a processing site, they may be enclosed in a contained area and treated with various gases, ultraviolet light, or microwaves to enhance their preparation for further processing according to operations described herein.

Plants, such as tumbleweed have the potential to reduce digestive enteric emissions (greenhouse gases from livestock). The cultivation of these native and invasive plants can also serve to premium carbon credits to support biodiversity and improve the growth and perseveration of sagebrush and animal life it supports not to limit protecting the accompanying soil conditions.

It should be noted that when a mixture of some plant-derived, prepared solutions, are allowed to stand for an extended period of time, this may cause the overall mixture to form molds that may have very excellent properties for many applications.

When preparing a solution not using a grind process and only using extreme heat over a prolonged time, it has been found that this may cause the solution to lose many of its inherent properties due to excessive heat and time.

At operation 5 of FIG. 1A, the plant feed stock can be stored and prepared in a gaseous or spray atmosphere to enhance the overall efficiency of method 100. The gases used may include oxygen, nitrogen, or other prepared gases and spray ingredients, such as acids, caustic substances, to nutrients or extracts from the process.

At operation 21, the refined material can be processed in parallel or series and/or recycled for reprocessing during the micro-grinding or shearing process.

At operation 30, there are many types of fluid separators for separating solids to liquid.

At operation 37, various separating equipment devices can be employed depending on the material(s) being processed and many types of light sources or gravitational instruments can be employed.

The intent of some embodiments is to employ all the practices involving the process of cultivating the native and invasive plants as crops after they have matured. Harvesting can be accomplished by at least two methods either manual harvesting or mechanical which would involve the use of machines presently being used for harvesting.

Some embodiments pertain to harvesting, invasive, and native plants spread across the United States and other locations throughout the world. Presently sagebrush, tumbleweed, cheat grass, hemp and many other grass species are not harvested for their real potential value. As discussed above in this document, the inventor has developed a new technology, whereby the so-called noxious portion or substrates of the plant or inhibitors are removed or minimized so the remaining plant portion can become a forage for total agricultural. By harvesting these plants in an agricultural good housekeeping manner, removing the inhibiting straight substances, these plants can provide viable hay supplements. Hay agrimony production is decreasing due to a variety of factors, including water shortages, fertilizer scarcity, rising costs or maybe climate change, provide needed carbon credits, conserve our natural resources not to mention the potential to reduce digestive enteric emissions (greenhouse gases). When the objectionable portion of these plants are removed, they provide a very viable forage for many agricultural animals and may also become a new source of gluten free products for human consumption or other commercial applications.

The following discussion pertains to noxious and/or invasive plants (e.g. tumbleweed, cheatgrass, sagebrush, hemp, and/or others). A subset of these are native plants that grow in the wild or in natural environments (e.g. tumbleweed, cheatgrass, sagebrush). The native plants (e.g. can be harvested in the existing agricultural way using standard harvesting machines and equipment which are now presently in use. For these native plants, implementing or applying these harvesting techniques and procedures should result in improved growth and health of these native plants. During harvesting techniques and procedures, seeds are dropped on the ground. And further, as agricultural machinery mows or harvests (the landscape for) these native plants, the seeds can become imbedded and even covered up. This action will significantly enhance these native plant's ability to populate and increase growth and the density of these plants in each location.

Numerous universities that have extension services for agriculture have noted that if these noxious and/or invasive plants could be harvested in an agricultural sound manner, they could be very valuable asset and be a provider of needed forage. Most of these noxious and/or invasive plants grow naturally over semi-desert areas and many these plants are semi to drought resistant plants. They do contain very valuable ingredients as an agricultural feed. Many animals that are in the wild do eat a portion of these plants and some animals can consume all parts of one or more of these noxious and/or invasive plants, but their tolerance level is usually limited. If these plants were harvested in a sound manner, it would increase the food supply as a natural plant for many types of animals and protect and conserve the environment.

The technology described in this document processes these noxious and/or invasive plants into a very high-quality hay or forage. This is performed by extracting substances that would be harmful to many types of animals. Meanwhile, the extracted substances can be a very valuable and significant natural chemical source (non-synthetic or man-made) for farmers, industry, and commercial business. For example, the oxalic acid found in tumbleweeds can be extracted and then be very effective in controlling or eliminating the mite infestation on bees, the control of infestation of snails on our waterways, and even controlling the beetle infestation greatly affected and destroying our national forests. These extracted substances and their related substrates make an excellent natural occurring pesticide. Therefore, processing these plants can have a multitude of positive effects on our environment and our future. On the one hand, a valuable food resource is produced. And on the other hand, the extract substances have value, as discussed above.

By removing these substances from the noxious and/or invasive plants, the noxious and/or invasive plants will not have a negative effect on the digestive system of animals. For example, hemp contains carbenoids that have not been found to be a positive ingredient for agricultural uses. These cannabinoids and the CBD oil contained in this plant are objectionable for animals and raise concerns as being a negative influence on our meat supply. They do have a significant place in the market as natural occurring chemistries but the remaining plant fiber from the hemp plant has met with great resistance for agricultural use because of these objectionable substrates. The massive amount of remaining fiber from this farmed plant also creates a significant disposal issue and significantly reduces their farming production. In the case of sagebrush, the main substance, terpenes may also contain other elements that may need to be removed.

Some embodiments described in this document apply to the harvesting and processing of all native and invasive plants that are not now being harvested for agrarian purposes.

The following plants (hemp, tumbleweed, cheatgrass, sagebrush, kutzu) may be processed in the described process for forage applications and the extracted chemicals to be used by industry, or other commercial operations. Many of these plants have subspecies or other families associated with them and are included due to their similar composition likeness. However, the process noted provides the ability to blend these selected families. For example, the sage brush group can be processed separately or together to remove the substance which are not needed or desirable in the forage itself.

There are many different varieties of hemp, each with their own unique characteristics and uses. There are several species of sagebrush, but the most well-known is *Artemisia tridentata*, which is commonly referred to as big sagebrush. Other species include black sagebrush (*Artemisia nova*), mountain sagebrush (*Artemisia tridentata* ssp. *vaseyana*), and fringed sagebrush (*Artemisia frigida*). However, all hemp strains belong to the same species, *Cannabis sativa*. Hemp can be broadly classified into three categories: fiber hemp, seed hemp, and CBD hemp. Within these categories, there are many different strains and cultivars of hemp with varying levels of THC, CBD, and other cannabinoids. Some popular strains of hemp include Charlotte's Web, ACDC, Harlequin, and Sour Tsunami.

Hemp is a variety of the *Cannabis sativa* plant species that is grown specifically for industrial use. The composition of hemp can vary depending on factors such as the strain, growing conditions, and cultivation practices. However, here are some general components of hemp:

Cannabinoids: Hemp contains several cannabinoids, including cannabidiol (CBD), which has become popular for its potential health benefits.

Terpenes: These are aromatic compounds found in many plants, including hemp. They give the plant its unique smell and taste.

Flavonoids: These are plant pigments that have antioxidant properties and may have potential health benefits.

Fiber: Hemp is known for its strong and durable fibers, which can be used to make textiles, paper, and other products.

Protein: Hemp seeds are a good source of plant-based protein, containing all essential amino acids.

Omega-3 and Omega-6 fatty acids: Hemp seeds contain these essential fatty acids in a balanced ratio, which is important for overall health. Thousands of tons of hemp waste have posed a major problem for the Hemp farming and its disposal. By removing the substances that inhibit their use as a forage this potential hemp waste now becomes a valuable forage or hemp feed or agricultural commodity.

Most tumbleweed plants contain oxalic acid which significantly inhibits their use as a forage. The other ingredients can be nitrates which can be removed by the process noted earlier. The process can include the use of a unique micro grind technology for particle commutation and plant cell exposure in conjunction or application of ultraviolet light, ultrasonics, microwaves followed by distillation, evaporation, and centrifuging, vacuum, and screening techniques to separate the potential targeted nuisance chemicals from the main fiber of the processed native or invasive plant as a useful forage. This preceding process allows for selective removal of all or practical reduction of the selected chemicals. It may be desirable to keep a fraction or some percentage of the removed substances for nutritional reasons if not deemed to be a hindrance. In general, these nuisance substances inhibit a positive use of these plants as a forage, but the oxalic acid extracted from tumbleweed can become an excellent natural pesticide.

There are several species of sagebrush, but the most well-known is *Artemisia tridentata*, which is commonly referred to as big sagebrush. Other species include black sagebrush (*Artemisia nova*), mountain sagebrush (*Artemisia tridentata* sp. *vaseyana*), and fringed sagebrush (*Artemisia frigida*).

The sagebrush and cheat grass composition contain terpenes and hemp for its CBD oils, trace amount of TCP and terpenes that can be further refined into viable products. After extraction these plants fibers can be blended in a pelletizing process homogenizing with supplemental additives. This final stage of the process allows for densification, excellent forage form, improved packaging, storage, transport, materials handling, standard field feed application ease and improved supply chain dynamics.

Tumbleweed is not a specific plant species, but rather a term used to describe any plant that breaks off at the stem and rolls with the wind. However, some common plant species that are known as tumbleweeds include Russian thistle (*Salsola tragus*) and various species of *Amaranthus* and *Bassia*. The chemical composition of these plants can include various organic compounds, including carbohydrates, proteins, and lipids. They may also contain minerals such as calcium, potassium, and magnesium. Again, the specific chemical structure of tumbleweed can vary depending on the plant species.

The opposite of cheatgrass is native grass. Cheatgrass is an invasive species that has negatively impacted native grasses and other plant species in many regions. Native grasses are the grasses that are naturally occurring in a particular ecosystem and have adapted to the local climate, soil type, and other environmental factors. Planting native grasses can help restore and maintain the ecological balance of an ecosystem.

The chemical structure of cheatgrass, also known as downy brome (scientific name: *Bromus tectorum*), is composed of various organic compounds such as carbohydrates, phenolics, and terpenes. It also contains minerals such as calcium, magnesium, potassium, and sulfur. However, the specific chemical composition of cheatgrass can vary depending on various factors such as the stage of growth, location, and environmental conditions.

Sagebrush is a common name for several species of the genus *Artemisia*. The chemistry of sagebrush varies depending on the species and the part of the plant that is analyzed. Here are some general components of sagebrush:

Essential oils: Sagebrush contains essential oils (EO) that are responsible for its characteristic smell. The oil is composed mainly of terpenes, such as camphor, cineole, and thujone.

Flavonoids: Sagebrush contains flavonoids, which are plant pigments that have antioxidant and anti-inflammatory properties. Some of the flavonoids found in sagebrush include apigenin and luteolin.

Tannins: Sagebrush contains tannins, which are plant compounds that bind to proteins and other biomolecules. Tannins have astringent properties and can be used for medicinal purposes.

Alkaloids: Some species of sagebrush contain alkaloids, which are nitrogen-containing compounds that can have psychoactive or medicinal effects. One example of an alkaloid found in sagebrush is artemisinin, which has antimalarial properties. Overall, the chemistry of sagebrush is complex and varies depending on the species and the part of the plant that is analyzed.

The potential value of tumbleweed and the other grasses noted herein can be a valuable forage as shown in Table 1 (showing amounts of nutrients in various forage plants) below.

TABLE 1

| Constituents | Wheat Straw | Tumbleweed | Alfalfa | SEM |
|---|---|---|---|---|
| DM (%) | 92.2 | 92.4 | 92.7 | 0.13 |
| CP (%) | 3.1 | 11.2 | 18.4 | 0.14 |
| CF (%) | 41.8 | 31.3 | 27.2 | 0.15 |
| EE (%) | 2.3 | 2.7 | 2.6 | 0.15 |
| Ash (%) | 5.8 | 11.3 | 10.7 | 0.38 |
| Ca (%) | 0.2 | 1.2 | 1.5 | 0.07 |
| P (%) | 0.1 | 0.3 | 0.2 | 0.01 |
| Mg (%) | 0.1 | 0.2 | 0.2 | 0.01 |
| Na (%) | 0.13 | 0.02 | 0.01 | 0.003 |
| K (%) | 1.2 | 1.8 | 1.8 | 0.11 |
| Zn (ppm) | ND | 58.1 | 24.1 | 2.24 |
| Cu (ppm) | 2.8 | 9.7 | 6.3 | 0.63 |
| Fe (ppm) | 148.5 | 362.1 | 154.4 | 9.56 |
| Mn (ppm) | 36.1 | 42.6 | 50.1 | 1.46 |

DM: Dry matter,
CP: Crude protein,
CF: Crude fiber,
EE: Ether extract.

This applied process technology allows for a lot of technique flexibility to extract selected substances and enhance these plants potential for forage usage. This also means supplying extracted naturally derived chemicals such as the terpenes and oxalic acid which would be used in ways similar to the present produced synthetic chemicals which are not as effective or cost effective. Additionally, many plants aroma associated with certain plants can affect their attraction as a forage, the technology mentioned may assist in reducing or eliminating this circumstance.

In some embodiments, the plants enhanced for use as forage may be combined with another forage such as certain species of grasses, legumes, silage, and agricultural crop residues to further enhance forage use (e.g., by helping to transition livestock to a new type of forage).

An important aspect of this method is the pelletization process itself, whereby a very uniform invasive plant and/or native plants can be comingled into a uniform feed chemistry.

The process of pelletization happens inside a pellet mill. It involves creating pelleted feeds by compression of raw material, which is in powder form. This compaction happens in the presence of some moisture, temperature, and pressure. Pelletized feeds are dense and heavy and thus they sink. Normally pelletizing of animal feeds can result in pellets from 1.2 mm (0.047 in) (shrimp feeds), through to 3-4 mm (0.12-0.16 in) (poultry feeds) up to 8-10 mm (0.31-0.39 in) (stock feeds). The pelletizing of stock feed is done with the pellet mill machinery, which is accomplished in a feed mill.

Pelleted feeds have been defined as "agglomerated feeds formed by extruding individual ingredients or mixtures by compacting and forcing through die openings by any mechanical process". Basically, the purpose of pelleting is to take a finely divided, sometimes dusty, unpalatable, difficult-to-handle feed material and by using heat, moisture, and pressure, form it into larger particles. These larger particles are easier to handle, more palatable and usually result in improved feeding results when compared to the unpelleted feed.

Figure 18:
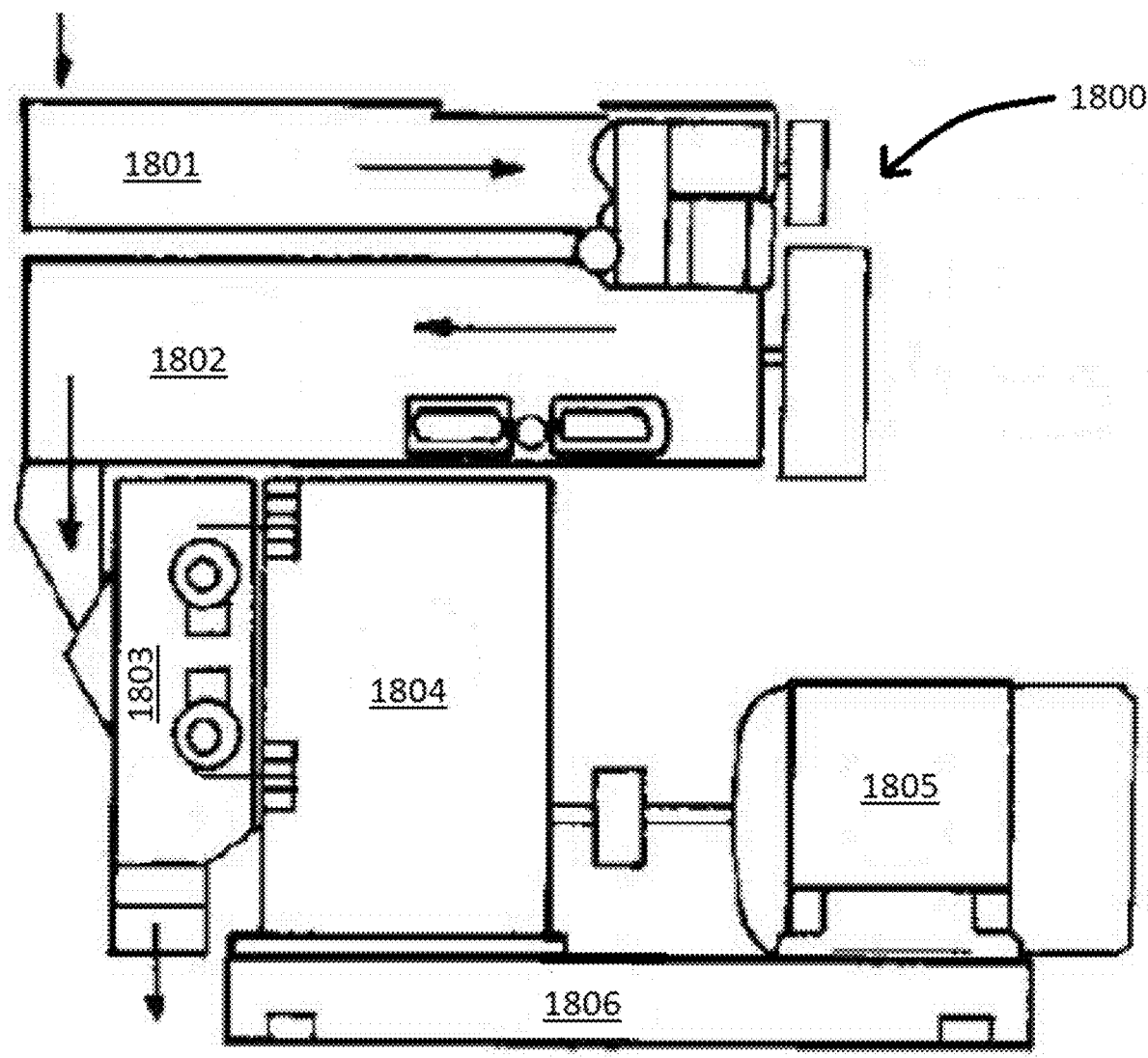
FIG. 18 is a schematic diagram of a sample pellet mill unit.

A typical pellet mill unit 1800 is illustrated in FIG. 18. The pellet mill unit 1800 may include a feeder 1801, a conditioning chamber 1802, a pelleting device 1803, a speed reduction device 1804, a motor 1805, and a base 1806. Similar compounding and agglomeration occur with extruders.

The feeder 1801 may provide a constant, controlled, and even flow of feed to the mixing and pelleting operation.

Variation in this flow may result in poor conditioning and a variable product. The feeder 1801 may deliver a constant and predetermined amount of meal to the conditioning chamber 1802. In the conditioning chamber, the meal is mixed with steam (heat and water) and other desirable liquids, such as molasses. A mixer may be provided in the conditioning chamber in order to properly condition the feed. The addition of steam supplies moisture for lubrication, liberates natural oils and, in some cases, results in partial gelatinization of starches.

The conditioned mast may then flow into the pelleting device 1803 where pellet mill die chamber utilizes rollers to press the softened mash through holes in the die. Stationary knives located outside the rotating die may cut off the shaped, dense pellet at a predetermined length. The pellet mill unit 1800 may incorporate the speed reduction device 1804 to compensate for the faster speed of the motor 1805.

Almost all livestock feeders agree that animals make better gains on nutrient rich pelleted feed than a normal meal ration. The most logical reasons are that (a) the heat generated in conditioning and pelleting make the feedstuffs more digestible by breaking down the starches, (b) the pellet simply puts the feed in a concentrated form, and (c) pelleting minimizes waste during the eating process. When pelleted feed is fed, each animal receives a well-balanced diet by preventing the animal from picking and choosing between ingredients. Tests have shown that most animals, if given the choice between the same feed in pellet or mash form will prefer the pellets.

By combining moisture, heat and pressure on feed ingredients, a degree of gelatinization is produced which allows animals and poultry to better utilize the nutrients in these ingredients.

Each animal species, on the average, consumed the same amount of feed (5.06 lb. per day of pellets vs. 5.02 lb. per day of mash), yet the pellet fed pigs gained a quarter of a pound per day more weight than did the mash fed animals (1.76 lb. vs. 1.54 lb. of gain per day). Since the pellet fed hogs gained more while eating the same amount, it is evident that pelleting causes the feed to be utilized more efficiently by these animals. This is shown in the comparison of the average amount of feed required for each pound of gain. The pellet fed hogs consumed 2.87 lb. of feed per pound of gain while the mash fed hogs needed 3.27 lb. to make a pound of weight gain. Pellet fed hogs not only gain faster but they do it with less feed for each pound of weight increase.

Pelleting prevents the segregation of ingredients in a mixing, handling, or feeding process. By feeding a pelleted feed, the animal is more apt to receive a totally mixed ration than one that has separated through these processes. It also prevents waste. Bulk density is increased, which enhances storage capabilities of most bulk facilities. Shipping facilities are also increased, thereby reducing transportation costs. This is particularly evident in such fibrous ingredients as alfalfa, gluten feed, oat hulls, rice, bran, etc. A better flow and handling characteristic of pellets are one of the least mentioned advantages but probably the most important, particularly as it relates to dairy farmers.

There are many various types of pelletizers and pelletizing feed systems available in the market. It is the purpose of this method to employ part, or all these established methods for the optimal invasive/native plant feed.

The systems and techniques previously described in this document can achieve a high level of extraction of the noxious substances from the noxious and/or invasive plant stock. In some cases, 90% of the noxious substances, measured by weight, are extracted from the noxious and/or invasive plant stock. In some cases, 95% or more of the noxious substances, measured by weight, are extracted from the noxious and/or invasive plant stock. In either case, the desired level of extraction can be achieved by the systems and techniques disclosed herein. Either 90% or 95% is sufficient to render the resulting plant residue suitable for animal consumption. That is, the plant residue is a high protein, high quality feed. For some animals, a 95% extraction of noxious substances by weight is desirable. The resulting plant residue is a solid fraction as compared with the extracted liquid fraction which is discussed.

Another consideration is the use of the extracted noxious substances in the extracted liquid fraction. The extracted substances include a combination of various substrates that reflect the chemistry of the particular noxious and/or invasive plant. This would include the other substrates associated with the extraction. What is to be achieved is a very natural occurring extraction composite of all the elements inherent in the plant extract to help make this a very powerful, natural pesticide. In some cases, these extracted composite substances are preserved in their natural occurring percentage compositions for optimum effectiveness. Additionally, the concentration of the substrates may vary depending on the application. For example, in the case of bee mite mediation, it may be only 1% by weight solution or higher tree beetle control, however, tree beetles' treatment may be much higher percentage by weight concentration. Also, additional natural occurring other substances, such as a natural oil, would also be used to enhance the effectiveness of the extracted substance solution. Refinement to a pure form site of oxalic acid may be required for commercial or industrial applications for other commercial industrial uses. It may also have many medicinal uses. In applied properly based on experimentation, this natural extracted solution can be an effective pesticide. The remaining removed fiber portion remaining percentage of the inhibiting substrates will depend on the application for agricultural uses. This means that there may be a minimal percentage say less than 1% by weight of the targeted sub straight substances remaining in the final forage product may have some benefit. If the resulting extracted liquid fraction is too dilute, it can be concentrated if a higher concentration is desired.

It will be understood by those skilled in the art that the terminology used in this specification and in the claims is "open" in the sense that the terminology is open to additional elements not enumerated. For example, the words "includes" should be interpreted to mean "including at least" and so on. Even if "includes at least" is used sometimes and "includes" is used other times, the meaning is the same: includes at least. In addition, articles such as "a" or "the" should be interpreted as not referring to a specific number, such as one, unless explicitly indicated. At times a convention of "at least one of A, B, or C" is used, the intent is that this language includes any of A alone, B alone, C alone, A and B, B and C, A and C, all of A, B, and C, or any combination thereof. The same is indicated by the conventions "one of more of A, B, or C." Similarly, the phrase "A, B, and/or C" is intended to include any of A alone, B alone, C alone, A and B, B and C, A and C, all of A, B, and C or any combination thereof.

And as previously indicated elements, components, or operations should not be regarded as essential unless they are so explicitly described. The teachings contained herein may be adapted to a variety of embodiments arranged and composed in a wide variety of ways.

The above description of various embodiments is intended to be illustrative not exhaustive and is not intended to limit this disclosure, its application, or uses. Those skilled in the art will be able to imagine embodiments not described but that are consistent with the principles and teachings described herein. Therefore, the above description of exemplary embodiments is not intended to limit the scope of this disclosure, which should be defined only in accordance with the following claims and equivalents thereof.

What is claimed is:

1. A method for extracting useful products from at least one of invasive, poisonous or toxic plant stock, the method comprising:
   conveying a slurry that contains at least one or more carrier liquids and at least some plant stock suspended in the one or more carrier liquids;
   driving at least one rotor disk of a set of flat grinding disks with a motor drive, the driving causing the set of flat grinding disks to accept the slurry on one or more surfaces, to grind the suspended plant stock, and to discharge the slurry;
   emitting microwave radiation, with at least one microwave emitter, toward at least a portion of the slurry while the suspended plant stock is ground; and
   separating the slurry into (1) a wet fiber suitable for further processing into one or more first products and (2) a liquid fraction suitable for further processing into one or more second products.

2. The method of claim 1, wherein the wet fiber includes at least one or more plant residues of the at least one of invasive, poisonous or toxic plant stock; and
   wherein the one or more first products include at least: one or more plant-based agricultural feeds containing the at least one or more plant residues; and
   wherein the one or more plant residues contain no more than 10% of the naturally occurring amount, by weight, of at least one noxious compound that was present in the at least one of invasive, poisonous or toxic plant stock prior to processing.

3. The method of claim 2, wherein the one or more plant residues of the at least one of invasive, poisonous or toxic plant stock comprises:
   one or more residues of at least one of tumbleweed, hemp, sagebrush, or cheat grass.

4. The method of claim 1, wherein the one or more second products include at least one of a pesticide, an insecticide or a fungicide.

* * * * *